United States Patent
Bates

(10) Patent No.: US 12,067,049 B2
(45) Date of Patent: *Aug. 20, 2024

(54) MUSIC DISCOVERY

(71) Applicant: Sonos, Inc., Santa Barbara, CA (US)

(72) Inventor: Paul Bates, Santa Clara, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,201

(22) Filed: Apr. 7, 2023

(65) Prior Publication Data

US 2023/0244714 A1 Aug. 3, 2023

Related U.S. Application Data

(63) Continuation of application No. 17/215,741, filed on Mar. 29, 2021, now Pat. No. 11,625,430, which is a (Continued)

(51) Int. Cl.
*G06F 16/00* (2019.01)
*G06F 16/40* (2019.01)
(Continued)

(52) U.S. Cl.
CPC ........... *G06F 16/632* (2019.01); *G06F 16/40* (2019.01); *G06F 16/48* (2019.01); *G06F 16/60* (2019.01);
(Continued)

(58) Field of Classification Search
CPC .......... H04N 21/43615; H04L 12/2809; H04L 41/0816; H04L 12/1886; H04L 41/0893;
(Continued)

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
EP 1860581 A1 11/2007
(Continued)

OTHER PUBLICATIONS

Advisory Action mailed on May 10, 2017, issued in connection with U.S. Appl. No. 14/317,610, filed Jun. 27, 2014, 3 pages.
(Continued)

*Primary Examiner* — Shyue Jiunn Hwa
(74) *Attorney, Agent, or Firm* — FORTEM IP LLP

(57) ABSTRACT

Examples described herein relate to music discovery. In one aspect, a method is provided that involves (a) receiving by a computing device an indication of a search tool from among a plurality of search tools, where each search tool of the plurality of search tools is associated with at least one respective media service, (b) receiving by the computing device an indication of a media characteristic, where the computing device receives the media characteristic via the indicated search tool, (c) selecting by the computing device one or more of the at least one respective media service that maintains media associate with the indicated media characteristic, and (d) sending by the computing device an indication of the selected one or more of the at least one respective media service.

20 Claims, 9 Drawing Sheets

Related U.S. Application Data continuation of application No. 16/119,746, filed on Aug. 31, 2018, now Pat. No. 10,963,508, which is a continuation of application No. 14/317,610, filed on Jun. 27, 2014, now Pat. No. 10,068,012.

(51) Int. Cl.
*G06F 16/48* (2019.01)
*G06F 16/60* (2019.01)
*G06F 16/63* (2019.01)
*G06F 16/632* (2019.01)
*G06F 16/638* (2019.01)
*G06F 16/68* (2019.01)

(52) U.S. Cl.
CPC ............ *G06F 16/63* (2019.01); *G06F 16/638* (2019.01); *G06F 16/68* (2019.01); *G06F 16/686* (2019.01)

(58) Field of Classification Search
CPC ............ H04L 41/0894; H04L 65/1045; H04L 65/1073; H04L 65/60; H04L 65/611; H04L 65/612; H04L 67/52; G06F 3/0679; G06F 11/0709; G06F 11/0751; G06F 11/3006; G06F 11/3055; G06F 11/3082; G06F 11/32; G06F 11/3419; G06F 11/3428; G06F 16/16; G06F 16/78; G06F 2201/815; G06F 2209/508; G06F 3/14; G06F 3/1454; G06F 8/24; G06F 8/73; G06F 9/5011
See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,108,686 | A | 8/2000 | Williams, Jr. |
| 6,256,554 | B1 | 7/2001 | DiLorenzo |
| 6,349,339 | B1 | 2/2002 | Williams |
| 6,389,467 | B1 | 5/2002 | Eyal et al. |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 6,826,283 | B1 | 11/2004 | Wheeler et al. |
| 6,985,694 | B1 | 1/2006 | De Bonet et al. |
| 7,124,125 | B2 | 10/2006 | Cook et al. |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,739 | B2 | 6/2007 | Chang |
| 7,236,773 | B2 | 6/2007 | Thomas |
| 7,295,548 | B2 | 11/2007 | Blank et al. |
| 7,469,283 | B2 | 12/2008 | Eyal et al. |
| 7,483,538 | B2 | 1/2009 | McCarty et al. |
| 7,496,623 | B2 | 2/2009 | Szeto et al. |
| 7,496,633 | B2 | 2/2009 | Szeto et al. |
| 7,571,014 | B1 | 8/2009 | Lambourne et al. |
| 7,599,685 | B2 | 10/2009 | Goldberg et al. |
| 7,630,501 | B2 | 12/2009 | Blank et al. |
| 7,643,894 | B2 | 1/2010 | Braithwaite et al. |
| 7,657,224 | B2 | 2/2010 | Goldberg et al. |
| 7,657,910 | B1 | 2/2010 | McAulay et al. |
| 7,725,533 | B2 | 5/2010 | Szeto et al. |
| 7,725,551 | B2 | 5/2010 | Szeto et al. |
| 7,739,271 | B2 | 6/2010 | Cook et al. |
| 7,742,740 | B2 | 6/2010 | Goldberg et al. |
| 7,835,689 | B2 | 11/2010 | Goldberg et al. |
| 7,853,341 | B2 | 12/2010 | McCarty et al. |
| 7,865,137 | B2 | 1/2011 | Goldberg et al. |
| 7,916,877 | B2 | 3/2011 | Goldberg et al. |
| 7,917,082 | B2 | 3/2011 | Goldberg et al. |
| 7,987,294 | B2 | 7/2011 | Bryce et al. |
| 8,014,423 | B2 | 9/2011 | Thaler et al. |
| 8,023,663 | B2 | 9/2011 | Goldberg |
| 8,028,038 | B2 | 9/2011 | Weel |
| 8,028,323 | B2 | 9/2011 | Weel |
| 8,045,952 | B2 | 10/2011 | Qureshey et al. |
| 8,050,652 | B2 | 11/2011 | Qureshey et al. |
| 8,103,009 | B2 | 1/2012 | McCarty et al. |
| 8,214,873 | B2 | 7/2012 | Weel |
| 8,230,099 | B2 | 7/2012 | Weel |
| 8,234,395 | B2 | 7/2012 | Millington |
| 8,483,853 | B1 | 7/2013 | Lambourne |
| 9,735,978 | B2 | 8/2017 | Kumar et al. |
| 10,055,491 | B2 | 8/2018 | Tripoli et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0056117 | A1 | 5/2002 | Hasegawa et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2004/0088328 | A1 | 5/2004 | Cook et al. |
| 2005/0021470 | A1 | 1/2005 | Martin et al. |
| 2005/0027871 | A1 | 2/2005 | Bradley et al. |
| 2006/0008256 | A1 | 1/2006 | Khedouri et al. |
| 2006/0179154 | A1* | 8/2006 | Sitaraman ............... H04L 43/00 709/228 |
| 2006/0253436 | A1 | 11/2006 | Cook et al. |
| 2006/0253547 | A1 | 11/2006 | Wood et al. |
| 2007/0033419 | A1 | 2/2007 | Kocher et al. |
| 2007/0088747 | A1 | 4/2007 | Cheng et al. |
| 2007/0142944 | A1 | 6/2007 | Goldberg et al. |
| 2007/0294131 | A1 | 12/2007 | Roman et al. |
| 2007/0297755 | A1 | 12/2007 | Holt et al. |
| 2008/0052371 | A1 | 2/2008 | Partovi et al. |
| 2009/0013260 | A1 | 1/2009 | Martin et al. |
| 2009/0307062 | A1 | 12/2009 | Lutnick et al. |
| 2010/0017366 | A1 | 1/2010 | Robertson et al. |
| 2010/0031366 | A1 | 2/2010 | Knight et al. |
| 2010/0205222 | A1 | 8/2010 | Gajdos et al. |
| 2010/0262909 | A1 | 10/2010 | Hsieh |
| 2012/0016662 | A1 | 1/2012 | Boldyrev et al. |
| 2012/0071996 | A1 | 3/2012 | Svendsen |
| 2012/0081209 | A1 | 4/2012 | Brown et al. |
| 2012/0088477 | A1 | 4/2012 | Cassidy |
| 2012/0117620 | A1 | 5/2012 | Cassidy et al. |
| 2013/0041696 | A1 | 2/2013 | Richard |
| 2013/0103814 | A1* | 4/2013 | Carrasco ............ H04L 65/4015 709/231 |
| 2013/0318187 | A1 | 11/2013 | Knight et al. |
| 2014/0123006 | A1 | 5/2014 | Chen et al. |
| 2015/0222680 | A1* | 8/2015 | Grover .................... H04W 4/48 709/204 |
| 2015/0234564 | A1 | 8/2015 | Snibbe et al. |
| 2015/0269200 | A1* | 9/2015 | Beckhardt ............... G06F 16/68 707/792 |
| 2015/0302108 | A1 | 10/2015 | Trivedi et al. |

FOREIGN PATENT DOCUMENTS

| | | |
|---|---|---|
| WO | 200153994 | 7/2001 |
| WO | 2003093950 A2 | 11/2003 |
| WO | 2005003899 A2 | 1/2005 |
| WO | 2007030191 A2 | 3/2007 |

OTHER PUBLICATIONS

Advisory Action mailed on Feb. 21, 2017, issued in connection with U.S. Appl. No. 14/317,610, filed Jun. 27, 2014, 5 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.

(56) References Cited

OTHER PUBLICATIONS

Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report mailed on Oct. 26, 2017, issued in connection with EP Application No. 15811605.3, 10 pages.
European Patent Office, European Office Action mailed on Feb. 5, 2019, issued in connection with European Application No. 15811605.3, 11 pages.
European Patent Office, Summons to Attend Oral Proceedings mailed on Aug. 31, 2020, issued in connection with European Application No. 15811605.3, 7 pages.
Final Office Action mailed on Dec. 6, 2016, issued in connection with U.S. Appl. No. 14/317,610, filed Jun. 27, 2014, 15 pages.
Final Office Action mailed on Mar. 6, 2017, issued in connection with U.S. Appl. No. 14/317,610, filed Jun. 27, 2014, 15 pages.
International Bureau, International Preliminary Report on Patentability mailed on Jan. 5, 2017, issued in connection with International Application No. PCT/US2015/033002, filed on May 28, 2015, 7 pages.
International Searching Authority, International Search Report and Written Opinion mailed on Sep. 3, 2015, issued in connection with International Application No. PCT/US2015/033002, filed on May 28, 2015, 16 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Jun. 6, 2016, issued in connection with U.S. Appl. No. 14/317,610, filed Jun. 27, 2014, 20 pages.
Non-Final Office Action mailed on Sep. 14, 2022, issued in connection with U.S. Appl. No. 17/215,741, filed Mar. 29, 2021, 14 pages.
Non-Final Office Action mailed on Jul. 21, 2020, issued in connection with U.S. Appl. No. 16/119,746, filed Aug. 31, 2018, 26 pages.
Non-Final Office Action mailed on Sep. 27, 2017, issued in connection with U.S. Appl. No. 14/317,610, filed Jun. 27, 2014, 19 pages.
Notice of Allowance mailed on Dec. 14, 2022, issued in connection with U.S. Appl. No. 17/215,741, filed Mar. 29, 2021, 5 pages.
Notice of Allowance mailed on Nov. 18, 2020, issued in connection with U.S. Appl. No. 16/119,746, filed Aug. 31, 2018, 15 pages.
Notice of Allowance mailed on Jun. 27, 2018, issued in connection with U.S. Appl. No. 14/317,610, filed Jun. 27, 2014, 5 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

MUSIC DISCOVERY

CROSS-REFERENCE TO RELATED APPLICATIONS

The present application is a continuation of U.S. patent application Ser. No. 17/215,741, filed Mar. 29, 2021, now U.S. Pat. No. 11,625,430, issued Apr. 11, 2023, which is a continuation of U.S. patent application Ser. No. 16/119,746, filed Aug. 31, 2018, now U.S. Pat. No. 10,963,508, issued Mar. 30, 2021, which is a continuation of U.S. patent application Ser. No. 14/317,610, filed Jun. 27, 2014, now U.S. Pat. No. 10,068,012, issued Sep. 4, 2018, each of which is incorporated herein by reference in its entirety.

FIELD OF THE DISCLOSURE

The disclosure is related to consumer goods and, more particularly, to methods, systems, products, features, services, and other items directed to media playback or some aspect thereof.

BACKGROUND

Options for accessing and listening to digital audio in an out-loud setting were severely limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from virtually unlimited sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
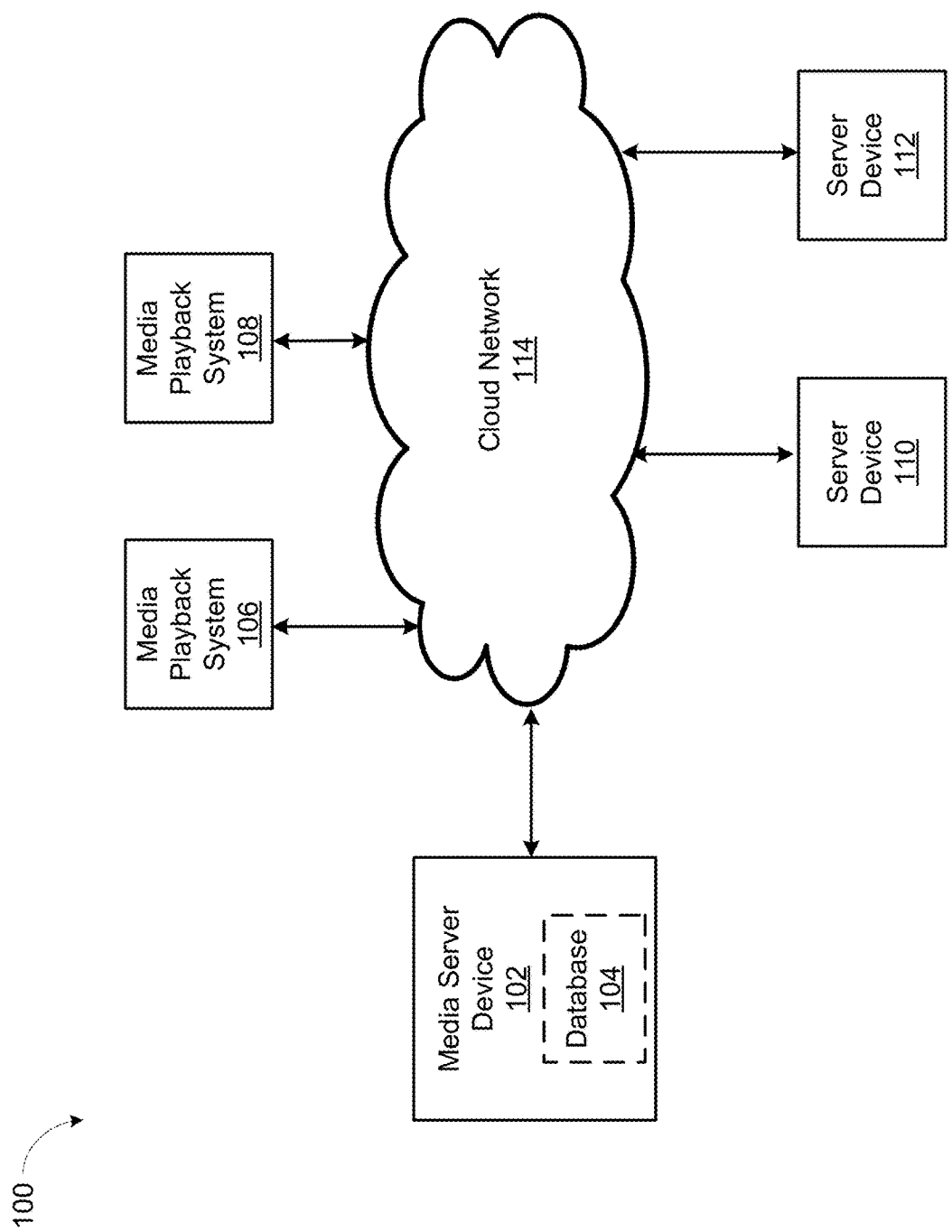
FIG. 1 shows an example network configuration in which certain examples may be practiced.

The drawings are for the purpose of illustrating examples, but it is understood that the inventions are not limited to the arrangements and instrumentality shown in the drawings.

DETAILED DESCRIPTION

I. Overview

A music discovery process may involve an introduction to various types of media. For example, a music discovery process may involve introducing certain sounds, genres of music, musical artists, albums, and musical tracks, among other types of media. Further, one or more inputs may initiate or lead the music discovery process. For instance, an input may involve a selection of a media service for providing music-related media. In such a case, a music discovery process may follow a service-based approach that includes an initial selection of a service (e.g., Pandora® Radio, Spotify®, Slacker® Radio, Google Play™, Rhapsody® Music Service, iTunes Radio$^{SM}$, and others), and then a selection of media that is maintained by the selected service.

In some examples, a music discovery process may be guided by various features of the selected service. For example, consider a music discovery process involving an internet radio service, possibly among other services. The internet radio service may include a browsing input for discovering various types of media. As such, a particular genre of music (e.g., rock, jazz, electronic, and classical) may be entered into the browsing input and the internet radio service may determine a number of artists and/or songs related to the particular genre of music.

Further, a music discovery process may be guided by the selected service's ability or inability to provide media. For example, considering the scenario above, the internet radio service may provide certain artists, albums, and/or tracks for the particular genre of music. In addition, the internet radio may require additional inputs to identify particular artists, albums, and/or tracks. In some instances, the internet radio service may provide suggestions to guide or possibly influence the exploration of particular areas of music.

According to examples described herein, a music discovery process may involve inputs that are not initially associated with a particular media service. For example, music discovery tools may be used before a particular media service is identified to facilitate the identification of media or exposure to media without first identifying a particular media service. As such, a music discovery process may introduce media without initially requiring inputs for selecting a particular media service at the beginning of the process. In such a situation, such music discovery processes may allow exploration of media to minimize or possibly eliminate potential influences from services. Further, such music discovery processes may allow exploration of a more expansive collection of media that is not associated with any single, particular media service.

As such, examples provided herein relate to a music discovery process. In one aspect, a method is provided. The method involves (a) receiving by a computing device an indication of a search tool from among a plurality of search tools, wherein each search tool of the plurality of search tools is associated with at least one respective media service, (b) receiving by the computing device an indication of a media characteristic, wherein the computing device receives the media characteristic via the indicated search tool, (c) selecting by the computing device one or more of the at least one respective media service that maintains media associated with the indicated media characteristic; and (d) sending by the computing device an indication of the selected one or more of the at least one respective media service.

In another aspect, a non-transitory computer-readable medium is provided. The non-transitory computer-readable medium having instructions stored thereon that are executable by a computing device to cause the first computing device to perform functions, the functions include (a) receiving by the computing device a selection of a search tool from among a plurality of search tools, wherein the selected search tool includes a search input, (b) receiving by the computing device an indication of a media characteristic, wherein the computing device receives the media characteristic via the search input, (c) selecting by the computing device one or more media services that maintain media associated with the indicated media characteristic, and (d) causing the computing device to display the one or more media services.

In another example aspect, a method is provided. The method involves (a) receiving by a computing device an indication of a media characteristic, (b) selecting by the computing device one or more media services that maintain media associated with the indicated media characteristic, (c) selecting by the computing device a plurality of categories, wherein each category of the plurality of categories is associated with at least one respective media service of the one or more media services, (d) sending by the computing device an indication of the plurality of categories, (e) receiving by the computing device an indication of a particular category among the plurality of categories, and (f) after receiving the indication of the particular category, sending by the computing device an indication of the at least one respective media service of the one or more media services associated with the particular category.

In yet another example aspect, another method is provided. The method involves, (a) receiving by the computing device a selection of a search tool from among a plurality of search tools, wherein the selected search tool includes a search input, (b) receiving by the computing device an indication of a media characteristic, wherein the computing device receives the media characteristic via the search input, (c) selecting by the computing device one or more of the media services that maintain media associated with the indicated media characteristic, and (d) causing the computing device to display the one or more media services.

In one other example aspect, an additional method is provided. The method involves (a) displaying by a computing device a search input, (b) receiving by the computing device an indication of a media characteristic, wherein the computing device receives the media characteristic via the search input, (c) selecting by the computing device one or more media services that maintain media associated with the indicated media characteristic, (d) selecting by the computing device a plurality of categories, wherein each category of the plurality of categories is associated with at least one respective media service of the one or more media services, (e) displaying by the computing device the plurality of categories, (f) receiving by the computing device an indication of a particular category among the plurality of categories, and (g) after receiving the indication of the particular category, displaying by the computing device the at least one respective media service associated with the particular category.

It will be understood by one of ordinary skill in the art that this disclosure includes numerous other examples. While some examples described herein may refer to functions performed by given actors such as "users" and/or other entities, it should be understood that this is for purposes of explanation only. The claims should not be interpreted to require action by any such example actor unless explicitly required by the language of the claims themselves.

II. Example Network Configuration

FIG. 1 shows an example network configuration 100 in which one or more examples disclosed herein may be practiced or implemented. As shown, the network configuration 100 may include a computing device 102, which may be referred to herein as media server device 102. Further, the network configuration 100 may also include two or more media playback systems 106 and 108. Yet further, the network configuration 100 may also include two or more computing devices 110 and 112, which may be referred to as server devices 110 and 112, respectively. In addition, the network configuration 100 may also include a cloud network 114. In some examples, the media server device 102 may include a database 104. In other examples, the database 104 may be located on a different network-connected element, perhaps one that is not shown. Accordingly, it should be understood that the network configuration 100 may include additional network-connected elements as well.

The cloud network 114 may communicatively couple the various network elements of the network configuration 100. In such an arrangement, the media server device 102 may communicate with the media playback systems 106-108 and/or the server devices 110-112 via the cloud network 114. Similarly, the media playback systems 106-108 may communicate with the server devices 110-112 via the cloud network 114. Further, the media playback systems 106-108 may communicate with one another via the cloud network 114. The cloud network 114 may be, for example, a wide-area network (WAN). As such, the cloud network 114 may include the Internet and/or one or more cellular networks, among other networks.

Generally, media playback systems 106-108 may be any type of media playback system configured to receive and transmit data over a data network and playback media items. Each of the media playback systems 106-108 may be physically located in different locations. Alternatively, the media playback systems 106-108 may be physically located in the same location (e.g., an office building). In practice, a media playback system 106-108 may include one or more playback devices. An example of such a media playback system is discussed in further detail below with reference to example media playback system 200.

One or more of server devices 110-112 may include at least one processor, data storage, and a network interface, among other components. One or more of server devices 110-112 may be configured to store media items (e.g., a media library) and/or access such media items to transmit to a playback device. One or more of server devices 110-112 may also create or obtain metadata related to the media items, as well as store such metadata.

In practice, the server devices 110-112 may provide media or media content to the media playback systems 106-108. In particular, each media service may provide streaming media and/or media downloads, among other examples. Each server device may provide "Internet radio" service and/or "on-demand" service (e.g., where a user may request a particular media item) to one or both of the media playback systems 106-108. When one or more of server devices 110-112 provides a media item to a media playback system, the server device may provide metadata along with the media item.

The media server device 102 may include a network interface, a processing unit, and data storage, all of which may be communicatively linked together by a system bus, network, or other connection mechanism. The network interface may facilitate data flow between the media server device 102 and other network elements on the cloud network 114. The processing unit may include one or more general purpose processors and/or one or more special purpose processors and may be integrated in whole or in part with the network interface. The data storage may include a non-transitory computer-readable medium, such as optical, magnetic, or flash memory, and may be integrated in whole or in part with the processing unit. The data storage may then include program instructions that are executable by the processing unit to carry out various functions described herein.

In example implementations, the data storage may also include the database 104 that may contain data related to media items. The data may be stored in the form of a table or the like. In some implementations, the database 104 may include data that may be used by the media server device 102 to perform cross-service linking functions. Accordingly, the database 104 may be referred to herein as a "cross-service linking database." In other examples, the media server device 102 may utilize an external database or the like to perform cross-service linking functions.

In general, cross-service linking involves the media system server 102 receiving a first media-item identifier of a first service provider and outputting a second media-item identifier of a second service provider, where the first media-item identifier and the second media-item identifier identify substantially the same underlying media content. In practice, each media service server 110-112 may maintain a respective database that includes media provided by the respective media service. And typically, each respective database may be maintained in a unique manner. As such, without using the cross-service linking database 104, information used to retrieve media from the media service server 110 may not be useful for retrieving media from the media service server 112. Accordingly, the cross-service linking database 104 may facilitate accessing media from a given media service (e.g., the media service server 112) using information related to a different media service (e.g., the media service server 110).

In example implementations, the media system server 102 may be configured to maintain the cross-service linking database 104, which may involve a number of functions. For example, the media system server 102 may receive a first message from the media playback system 106. For instance, after or while the media playback system 106 plays a first media item, the media playback system 106 may transmit the first message to the media system server 102. The first message may identify a first service (e.g., service provided by the media service server 110) used by the media playback system 106 to obtain the first media item for playback. The first message may also include a first service media-item identifier that the media service server 110 uses to identify the first media item. Further, the first message may include a first metadata that is associated with the first media item (e.g., a track title, artist name, album title, etc.). The media system server 102 may store some or all of this first message information in the cross-service linking database 104.

The media system server 102 may thereafter receive a second message from the media playback system 108. As with the first message, the second message may identify a second service (e.g., service provided by the media service server 112) used by the media playback system 108 to obtain a second media item for playback, a second service media-item identifier used to identify the second media item, and a second metadata that is associated with the second media item. The media system server 102 may store some or all of this second message information in the database 104.

The media system server 102 may then compare the second metadata with the first metadata that was previously stored in the database 104 to determine if, and to what extent, the first metadata and the second metadata have any similarities. If the media system server 102 determines that the second metadata and the first metadata are substantially similar, the media system server 102 may infer that the first media item and the second media item have comparable underlying media content. In response, the media system server 102 may store association data in the database 104 indicating that the first service media-item identifier and the second service media-item identifier identify media items that include the same content. Association data may be generated for storage in database 104 in other ways as well.

As a result of such an association, the media system server 102 may use the cross-service linking database 104 to retrieve the second service media-item identifier using the first service media-item identifier and vice versa. In practice, the media system server 102 may perform cross-service linking for a plurality of media items. In this way, a user who does not have access to a first service but does have access to a second service may still obtain desired media content from the second service using media-item information of the first service.

For example, the media server device 102 may receive a message from the media playback system 106. For instance, after or while the media playback system 106 plays a media item, the media playback system 106 may transmit the message to the media server device 102. The message may identify a service (e.g., a service provided by the server device 110) used by the media playback system 106 to obtain the media item for playback. The message may also include an identifier that the server device 110 uses to identify the media item. Further, the message may include metadata that is associated with the media (e.g., a track title, artist name, album title, etc.). The media server device 102 may store some or all of this message information in the database 104.

In some implementations, some or all of the cross-service linking functions described above may be carried out by any other suitable network element. Furthermore, in example implementations, one network element (e.g., the media server device 102) may perform cross-service linking functions to build one or more cross-service linking databases, and then another network element (e.g., a computing device of either of the media playback systems 106, 108) may locally store and/or reference the cross-service linking database.

III. Example Media Playback System

Figure 2:
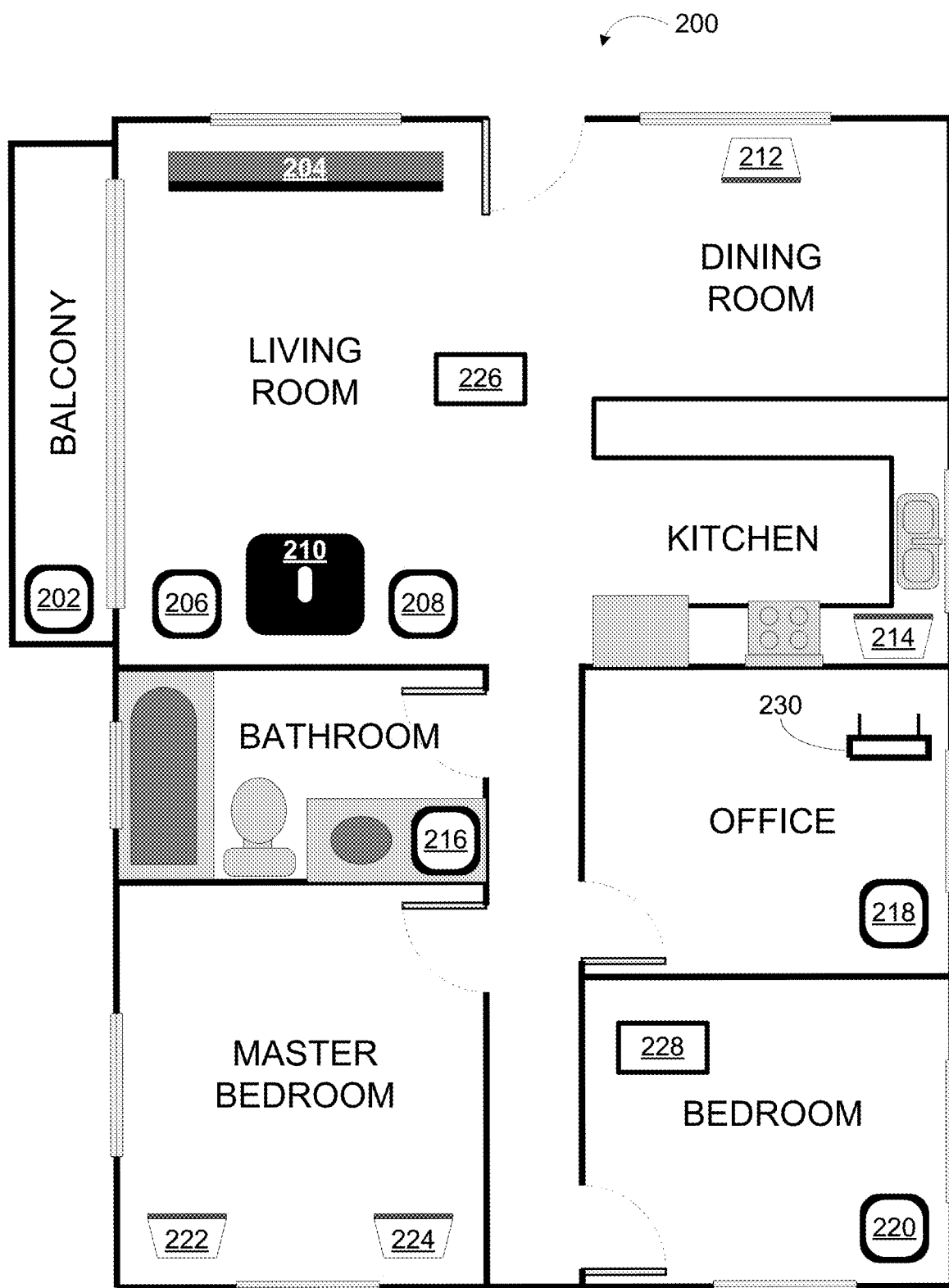
FIG. 2 shows an example media playback system configuration.

FIG. 2 shows an example configuration of a media playback system 200. The media playback system 200 as shown is associated with an example home environment having several rooms and spaces, such as for example, a master bedroom, an office, a dining room, and a living room. As shown in the example of FIG. 2, the media playback system 200 includes playback devices 202-224, computing devices 226 and 228 (also referred to herein as control devices 226 and 228, respectively), and a wired or wireless network router 230.

Further discussions relating to the different components of the example media playback system 200 and how the different components may interact to provide a music discovery may be found in the following sections. While discussions herein may generally refer to the example media playback system 200, technologies described herein are not limited to applications within, among other things, the home environment as shown in FIG. 2. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 3:
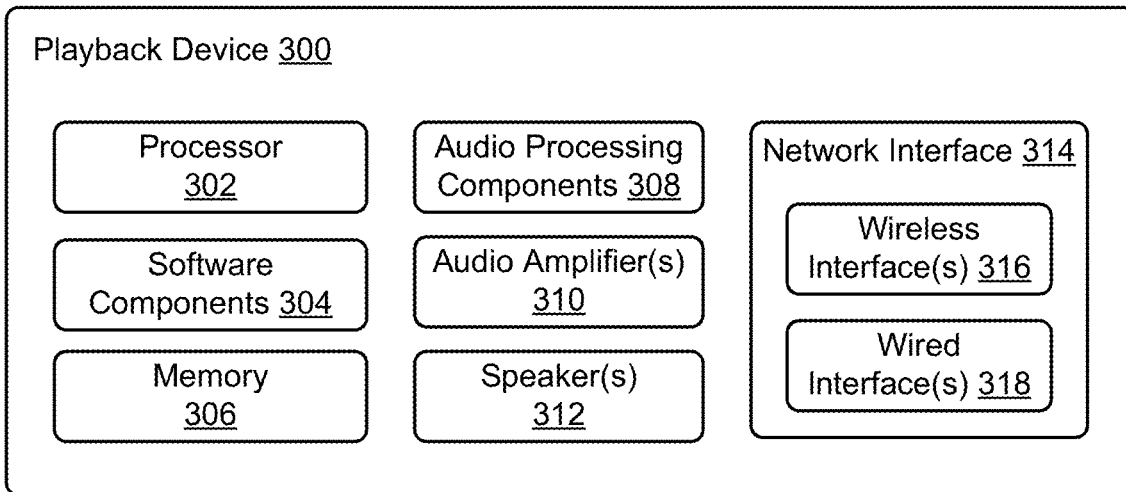
FIG. 3 shows a functional block diagram of an example playback device.

FIG. 3 shows a functional block diagram of an example playback device 300 that may be configured to be one or more of the playback devices 202-224 of the media playback system 200 of FIG. 2. The playback device 300 may include a processor 302, software components 304, memory 306, audio processing components 308, audio amplifier(s) 310, speaker(s) 312, and a network interface 314 including wireless interface(s) 316 and wired interface(s) 318. In one case, the playback device 300 may not include the speaker(s) 312, but rather a speaker interface for connecting the playback device 300 to external speakers. In another case, the playback device 300 may include neither the speaker(s) 312 nor the audio amplifier(s) 310, but rather an audio interface for connecting the playback device 300 to an external audio amplifier or audio-visual receiver.

In one example, the processor 302 may be a clock-driven computing component configured to process input data according to instructions stored in the memory 306. The memory 306 may be a tangible computer-readable medium configured to store instructions executable by the processor 302. For instance, the memory 306 may be data storage that can be loaded with one or more of the software components 304 executable by the processor 302 to achieve certain functions. In one example, the functions may involve the playback device 300 retrieving audio data from an audio source or another playback device. In another example, the functions may involve the playback device 300 sending audio data to another device or playback device on a network. In yet another example, the functions may involve pairing of the playback device 300 with one or more playback devices to create a multi-channel audio environment.

Certain functions may involve the playback device 300 synchronizing playback of audio content with one or more other playback devices. During synchronous playback, a listener will preferably not be able to perceive time-delay differences between playback of the audio content by the playback device 300 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 306 may further be configured to store data associated with the playback device 300, such as one or more zones and/or zone groups the playback device 300 is a part of, audio sources accessible by the playback device 300, or a playback queue that the playback device 300 (or some other playback device) may be associated with. The data may be stored as one or more state variables that are periodically updated and used to describe the state of the playback device 300. The memory 306 may also include the data associated with the state of the other devices of the media system, and shared from time to time among the devices so that one or more of the devices have the most recent data associated with the system. Other examples are also possible.

The audio processing components 308 may include one or more digital-to-analog converters (DAC), an audio preprocessing component, an audio enhancement component or a digital signal processor (DSP), and so on. In one embodiment, one or more of the audio processing components 308 may be a subcomponent of the processor 302. In one example, audio content may be processed and/or intentionally altered by the audio processing components 308 to produce audio signals. The produced audio signals may then be provided to the audio amplifier(s) 310 for amplification and playback through speaker(s) 312. Particularly, the audio amplifier(s) 310 may include devices configured to amplify audio signals to a level for driving one or more of the speakers 312. The speaker(s) 312 may include an individual transducer (e.g., a "driver") or a complete speaker system involving an enclosure with one or more drivers. A particular driver of the speaker(s) 312 may include, for example, a subwoofer (e.g., for low frequencies), a mid-range driver (e.g., for middle frequencies), and/or a tweeter (e.g., for high frequencies). In some cases, each transducer in the one or more speakers 312 may be driven by an individual corresponding audio amplifier of the audio amplifier(s) 310. In addition to producing analog signals for playback by the playback device 300, the audio processing components 308 may be configured to process audio content to be sent to one or more other playback devices for playback.

Audio content to be processed and/or played back by the playback device 300 may be received from an external source, such as via an audio line-in input connection (e.g., an auto-detecting 3.5 mm audio line-in connection) or the network interface 314.

The network interface 314 may be configured to facilitate a data flow between the playback device 300 and one or more other devices on a data network. As such, the playback device 300 may be configured to receive audio content over the data network from one or more other playback devices in communication with the playback device 300, network devices within a local area network, or audio content sources over a wide area network such as the Internet. In one example, the audio content and other signals transmitted and received by the playback device 300 may be transmitted in the form of digital packet data containing an Internet Protocol (IP)-based source address and IP-based destination addresses. In such a case, the network interface 314 may be configured to parse the digital packet data such that the data destined for the playback device 300 is properly received and processed by the playback device 300.

As shown, the network interface 314 may include wireless interface(s) 316 and wired interface(s) 318. The wireless interface(s) 316 may provide network interface functions for the playback device 300 to wirelessly communicate with other devices (e.g., other playback device(s), speaker(s), receiver(s), network device(s), control device(s) within a data network the playback device 300 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 318 may provide network interface functions for the playback device 300 to communicate over a wired connection with other devices in accordance with a communication protocol (e.g., IEEE 802.3). While the network interface 314 shown in FIG. 3 includes both wireless interface(s) 316 and wired interface(s) 318, the network interface 314 may in some examples include only wireless interface(s) or only wired interface(s).

In one example, the playback device 300 and one other playback device may be paired to play two separate audio components of audio content. For instance, playback device 300 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 300 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 300 is a playback device designed to render low frequency range audio content (i.e. a subwoofer), the playback device 300 may be consolidated with a playback device designed to render full frequency range audio content. In such a case, the full frequency range playback device, when consolidated with the low frequency playback device 300, may be configured to render only the mid and high frequency components of audio content, while the low frequency range playback device 300 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of examples disclosed herein. Additionally, it is understood that a playback device is not limited to the example illustrated in FIG. 3 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 200 of FIG. 2, the environment may have one or more playback zones, each with one or more playback devices. The media playback system 200 may be established with one or more playback zones, after which one or more zones may be added, or removed to arrive at the example configuration shown in FIG. 2. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 2, the balcony, dining room, kitchen, bathroom, office, and bedroom zones each have one playback device, while the living room and master bedroom zones each have multiple playback devices. In the living room zone, playback devices 204, 206, 208, and 210 may be configured to play audio content in synchrony as individual playback devices, as one or more bonded playback devices, as one or more consolidated playback devices, or any combination thereof. Similarly, in the case of the master bedroom, playback devices 222 and 224 may be configured to play audio content in synchrony as individual playback devices, as a bonded playback device, or as a consolidated playback device.

In one example, one or more playback zones in the environment of FIG. 2 may each be playing different audio content. For instance, the user may be grilling in the balcony zone and listening to hip hop music being played by the playback device 202 while another user may be preparing food in the kitchen zone and listening to classical music being played by the playback device 214. In another example, a playback zone may play the same audio content in synchrony with another playback zone. For instance, the user may be in the office zone where the playback device 218 is playing the same rock music that is being playing by playback device 202 in the balcony zone. In such a case, playback devices 202 and 218 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 200 may be dynamically modified, and in some examples, the media playback system 100 supports numerous configurations. For instance, if a user physically moves one or more playback devices to or from a zone, the media playback system 200 may be reconfigured to accommodate the change(s). For instance, if the user physically moves the playback device 202 from the balcony zone to the office zone, the office zone may now include both the playback device 218 and the playback device 202. The playback device 202 may be paired or grouped with the office zone and/or renamed if so desired via a control device such as the control devices 226 and 228. On the other hand, if the one or more playback devices are moved to a particular area in the home environment that is not already a playback zone, a new playback zone may be created for the particular area.

Further, different playback zones of the media playback system 200 may be dynamically combined into zone groups or split up into individual playback zones. For instance, the dining room zone and the kitchen zone 214 may be combined into a zone group for a dinner party such that playback devices 212 and 214 may render audio content in synchrony. On the other hand, the living room zone may be split into a television zone including playback device 204, and a listening zone including playback devices 206, 208, and 210, if the user wishes to listen to music in the living room space while another user wishes to watch television.

c. Example Control Devices

Figure 4:
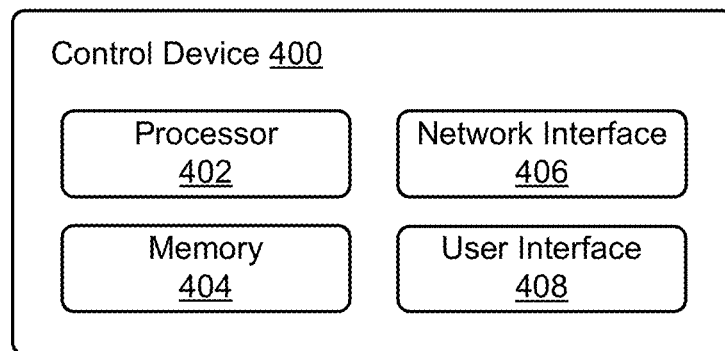
FIG. 4 shows a functional block diagram of an example computing device.

FIG. 4 shows a functional block diagram of an example computing device 400 which may also be referred to as control device 400. In some instances, computing device 400 may be configured to be one or both of the control devices 226 and 228 of the media playback system 200. As shown, the computing device 400 may include a processor 402, memory 404, a network interface 406, and a user interface 408. In one example, the computing device 400 may be a dedicated controller for the media playback system 200. In another example, the computing device 400 may be a network device on which media playback system controller application software may be installed, such as for example, an iPhone™, iPad™ or any other smart phone, tablet or network device (e.g., a networked computer such as a PC or Mac™).

The processor 402 may be configured to perform functions relevant to facilitating user access, control, and configuration of the media playback system 200. The memory 404 may be configured to store instructions executable by the processor 402 to perform those functions. The memory 404 may also be configured to store the media playback system controller application software and other data associated with the media playback system 200 and the user.

In one example, the network interface 406 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 406 may provide a means for the control device 400 to communicate with other devices in the media playback system 200. In one example, data and information (e.g., such as a state variable) may be communicated between control device 400 and other devices via the network interface 406. For instance, playback zone and zone group configurations in the media playback system 200 may be received by the control device 400 from a playback device or another network device, or transmitted by the control device 400 to another playback device or network device via the network interface 406. In some cases, the other network device may be another control device.

Playback device control commands such as volume control and audio playback control may also be communicated from the control device 400 to a playback device via the network interface 406. As suggested above, changes to configurations of the media playback system 200 may also be performed by a user using the control device 400. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 400 may sometimes be referred to as a controller, whether the control device 400 is a dedicated controller or a network device on which media playback system controller application software is installed.

Figure 5:
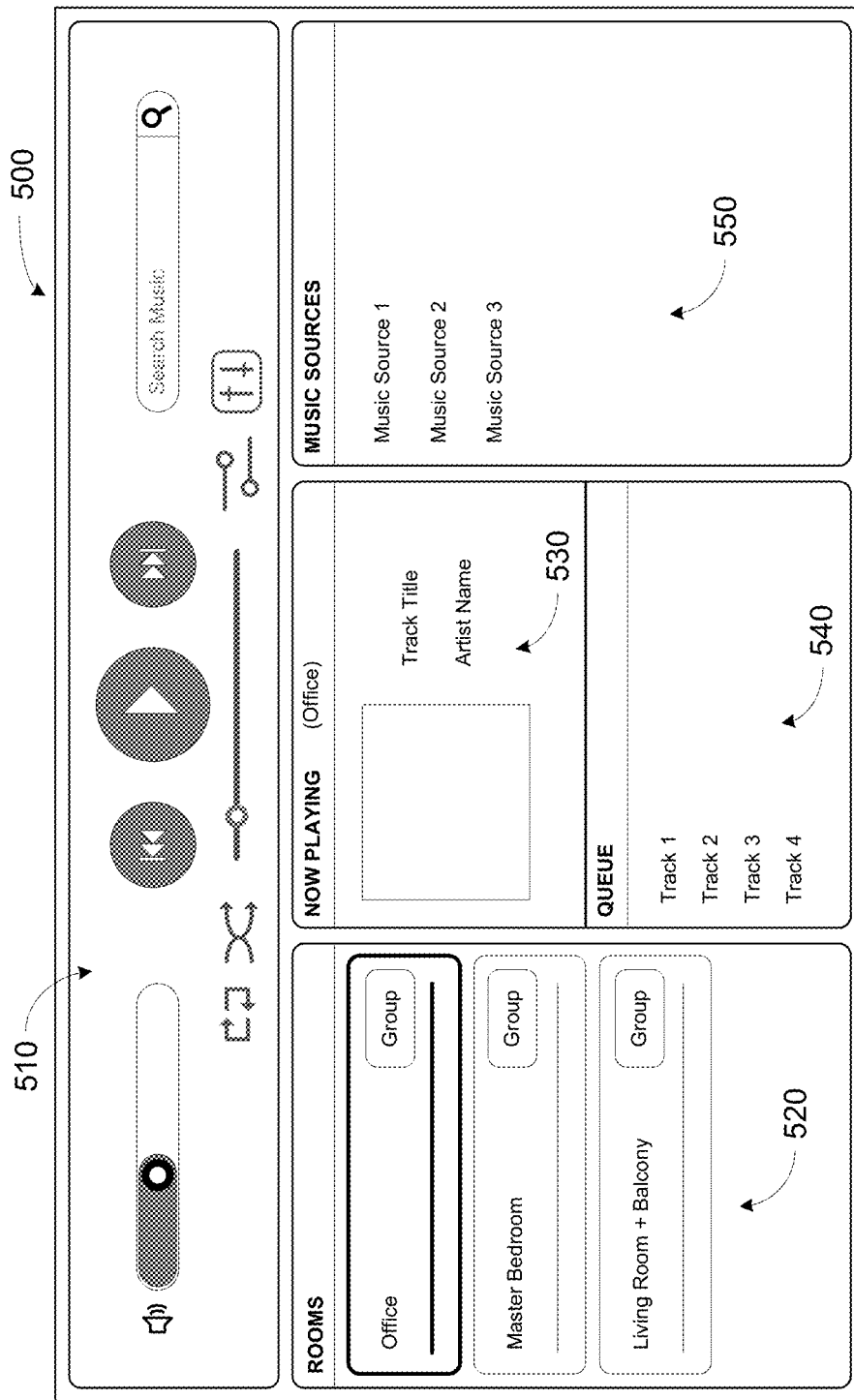
FIG. 5 shows an example controller interface.

The user interface 408 of the control device 400 may be configured to facilitate user access and control of the media playback system 200, by providing a controller interface such as the controller interface 500 shown in FIG. 5. The controller interface 500 includes a playback control region 510, a playback zone region 520, a playback status region 530, a playback queue region 540, and an audio content sources region 550. The user interface 500 as shown is just one example of a user interface that may be provided on a network device such as the control device 400 of FIG. 4 (and/or the control devices 226 and 228 of FIG. 2) and accessed by users to control a media playback system such as the media playback system 200. Other user interfaces of varying formats, styles, and interactive sequences may alternatively be implemented on one or more network devices to provide comparable control access to a media playback system.

The playback control region 510 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 510 may also include selectable icons to modify equalization settings, and playback volume, among other possibilities.

The playback zone region 520 may include representations of playback zones within the media playback system 200. In some examples, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 500 are also possible. The representations of playback zones in the playback zone region 520 may be dynamically updated as playback zone or zone group configurations are modified.

The playback status region 530 may include graphical representations of audio content that is presently being played, previously played, or scheduled to play next in the selected playback zone or zone group. The selected playback zone or zone group may be visually distinguished on the user interface, such as within the playback zone region 520 and/or the playback status region 530. The graphical representations may include track title, artist name, album name, album year, track length, and other relevant information that may be useful for the user to know when controlling the media playback system via the user interface 500.

The playback queue region 540 may include graphical representations of audio content in a playback queue associated with the selected playback zone or zone group. In some examples, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

The graphical representations of audio content in the playback queue region 540 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 550 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve media for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 200 of FIG. 2, local music libraries on one or more network devices (such as a control device, a network-enabled personal computer, or a networked-attached storage (NAS), for example), streaming audio services providing audio content via the Internet (e.g., the media service servers 135-145), or audio sources connected to the media playback system via a line-in input connection on a playback device or network devise, among other possibilities.

In some examples, audio content sources may be regularly added or removed from a media playback system such as the media playback system 200 of FIG. 2. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

IV. Example Methods of Music Discovery

As discussed above, music discovery processes may include processes for identifying various types of media. In some instances, such processes may identify media without initially having to select a particular media service for providing the media or prior to having to select the media service. In addition, various music discovery tools may be used to facilitate the process in identifying various types of media content.

Figure 6:
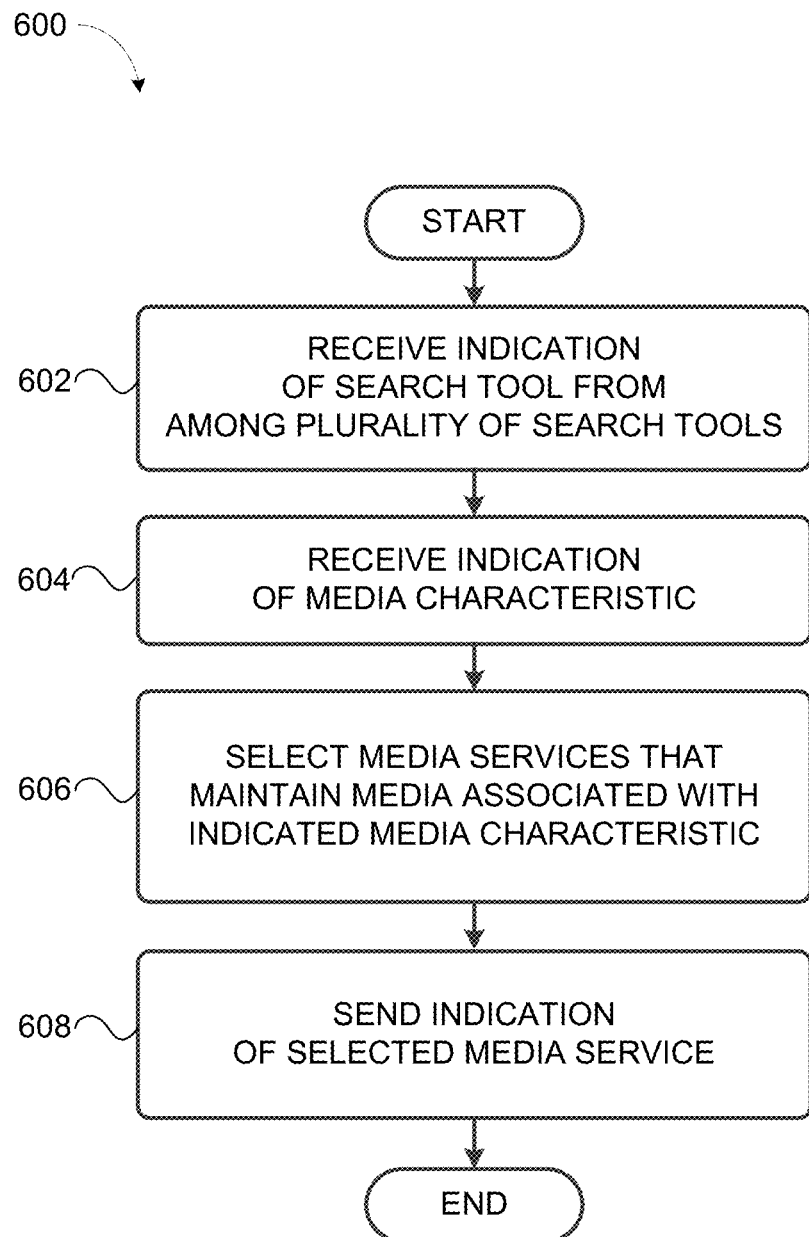
FIG. 6 shows a flow diagram of an example method.
Figure 10:
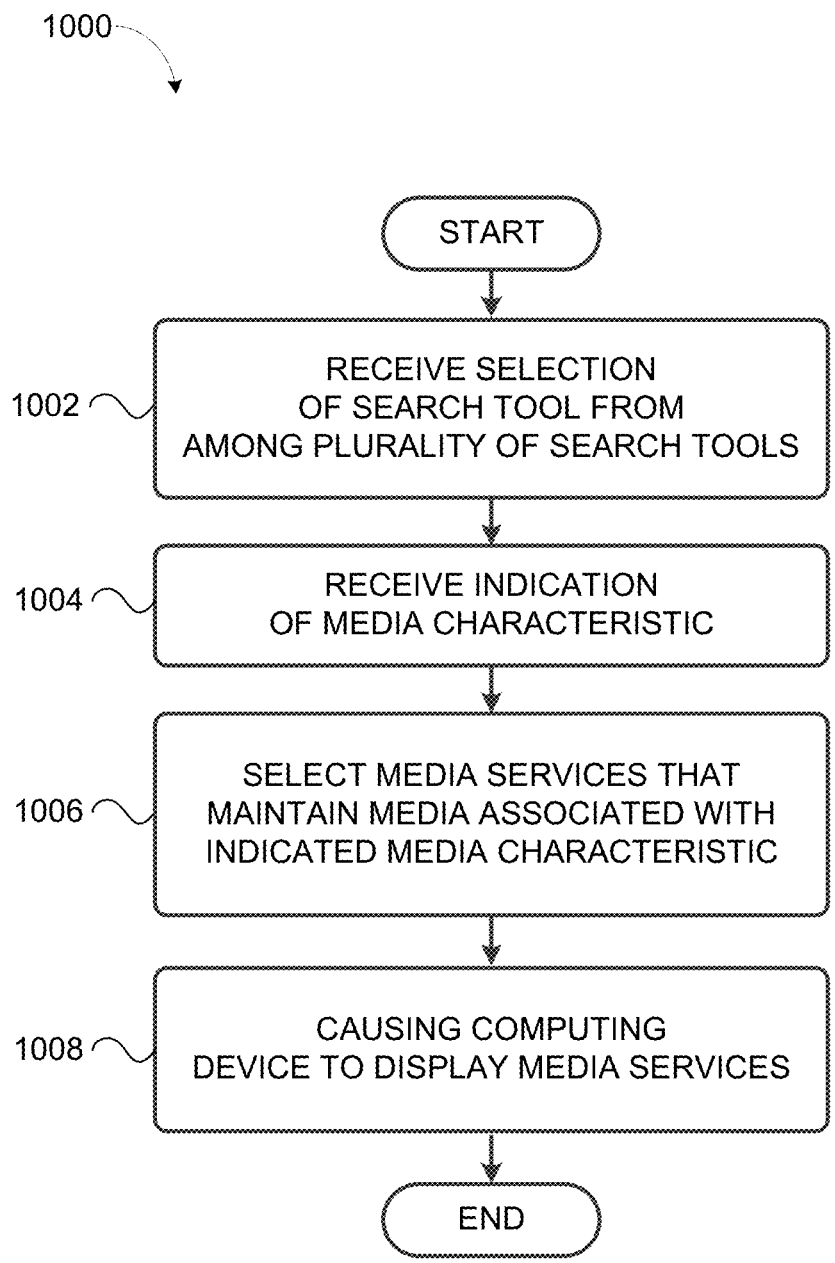
FIG. 10 shows a flow diagram of another example method.
Figure 11:
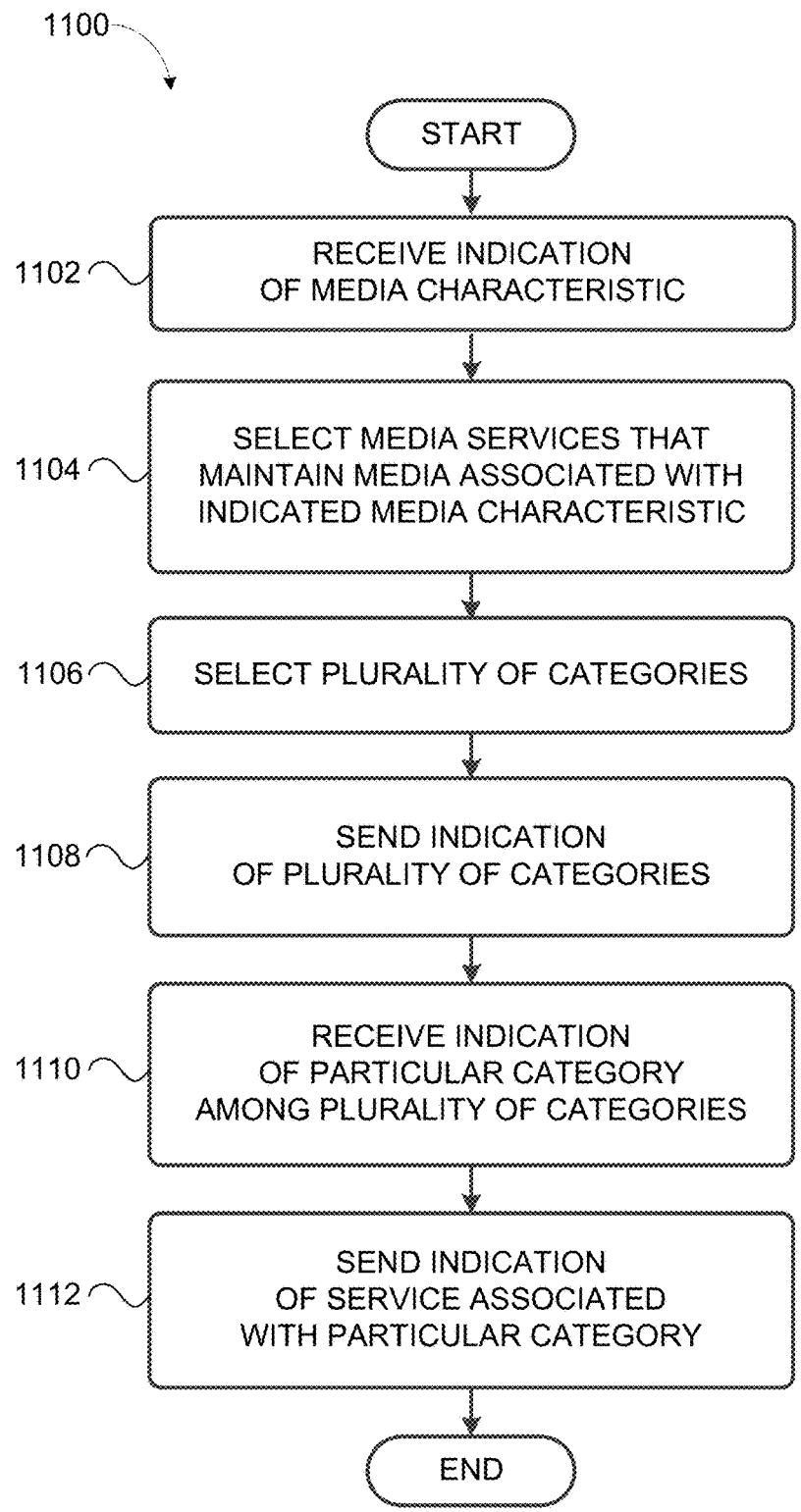
FIG. 11 shows a flow diagram of yet another example method.

For method 600 of FIG. 6, method 1000 of FIG. 10, and method 1100 of FIG. 11 and other processes and methods disclosed herein, the flowcharts show functionality and operation of one possible implementation of present examples. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, for the methods and processes disclosed herein, each block in FIGS. 6, 10, and 11 may represent circuitry that is wired to perform the specific logical functions in the process.

Furthermore, although the blocks are illustrated in sequential order, these blocks may also be performed in parallel, and/or in a different order than those described herein. Also, the various blocks may be combined into fewer blocks, divided into additional blocks, and/or removed based upon the desired implementation.

Figure 7:
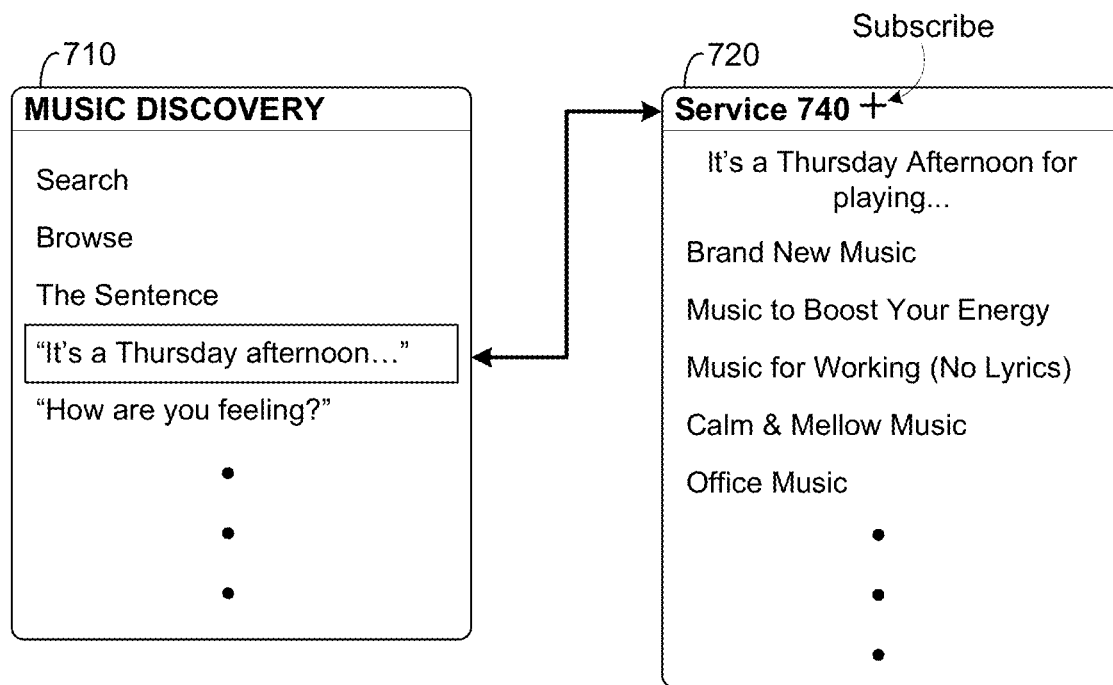
FIG. 7 shows a representation of an example search tool.
Figure 8:
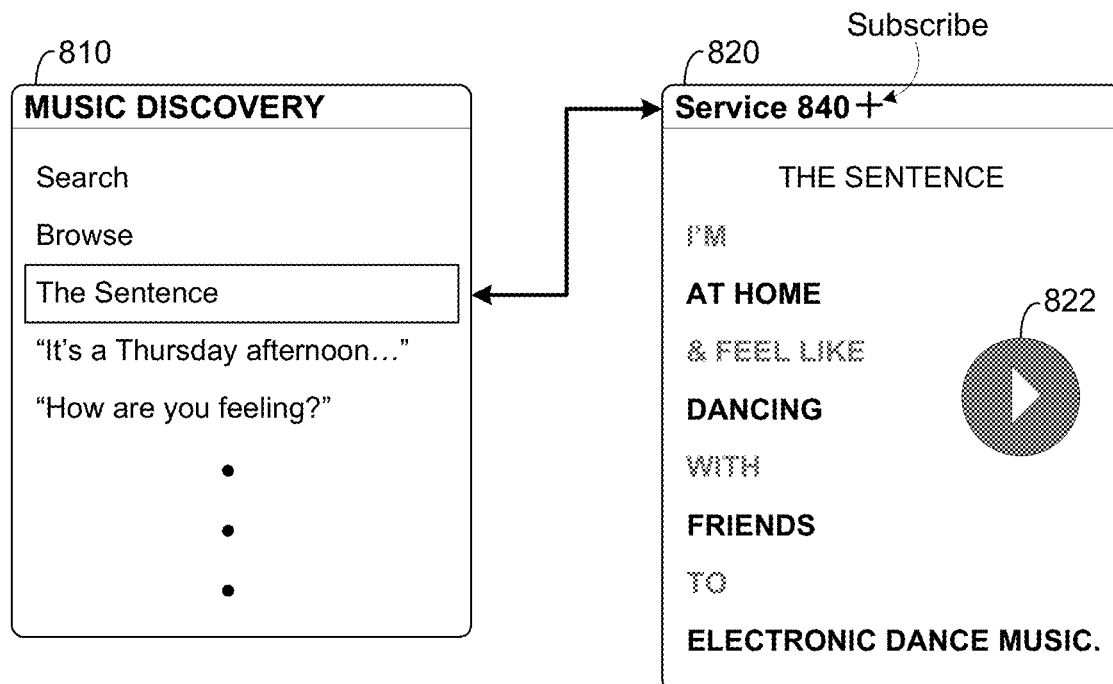
FIG. 8 shows a representation of another example search tool.
Figure 9:
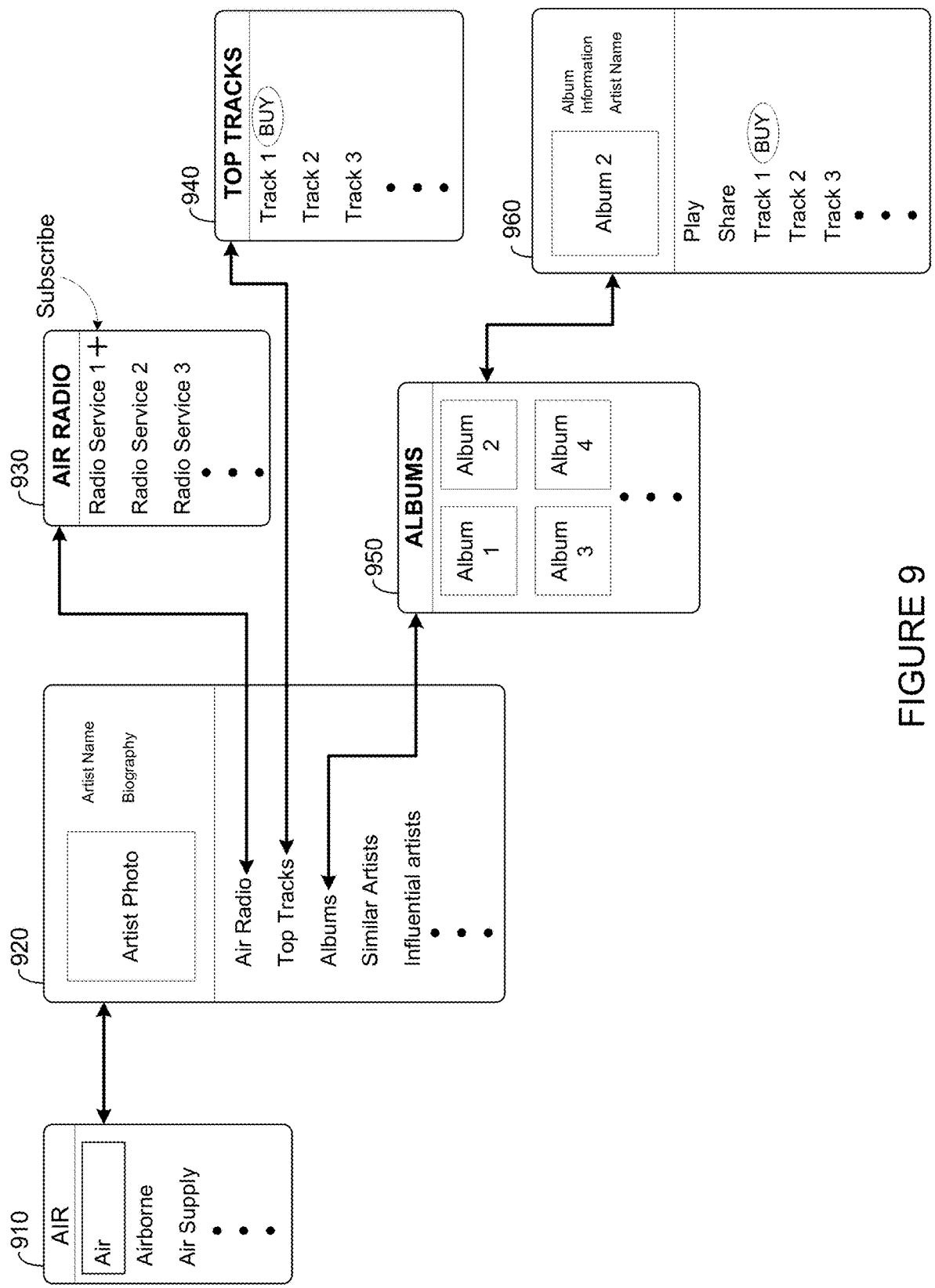
FIG. 9 shows a representation of an example search tool associated with media services.

For clarity, the methods 600, 1000, and 1100 may be described herein with reference to FIGS. 7, 8, and 9. It should be understood, however, that this is for purposes of example and explanation only and that the operations of the methods should not be limited by these figures.

1. First Example Method of Music Discovery

The method 600 shown in FIG. 6 presents an embodiment of a method that may be implemented within the network configuration 100. In particular, method 600 may be implemented by any of the computing devices 102, 110, and 112, as discussed above in relation to FIG. 1. It should be understood that method 600 may be carried out in other suitable network configurations and/or by other suitable network elements as well. Method 600 may include one or more operations, functions, or actions as illustrated by one or more of blocks 602-608.

The method 600 begins at block 602 with receiving by a computing device an indication of a search tool from among a plurality of search tools, where each search tool of the plurality of search tools is associated with at least one respective media service. At block 604, the method 600 involves receiving by the computing device an indication of a media characteristic, where the computing device receives the media characteristic via the indicated search tool. At block 606, the method 600 involves selecting by the computing device one or more of the at least one respective media service that maintains media associated with the indicated media characteristic. At block 608, the method 600 involves sending by the computing device an indication of the selected one or more of the at least one respective media service. The blocks shown in FIG. 6 are discussed in further detail below.

a. Receiving Indication of Search Tool from Among Plurality of Search Tools

The method 600 begins at block 602 with receiving by a computing device an indication of a search tool from among a plurality of search tools, where each search tool of the plurality of search tools is associated with at least one respective media service. As noted, the computing device may be any one of computing devices 102, 110, and 112. For example, one or more of computing devices 102, 110, and 112 may receive an indication of a search tool. Further, a computing device in the media playback systems 106 and/or 108 may receive an indication of a search tool and send the indication to one or more of the computing device 102, 110, and 112. As such, the computing devices 102, 110, and 112 may receive the indication of the search tool over the cloud network 114.

FIGS. 7 and 8 show representations of example search tools. As shown in FIGS. 7 and 8, the representations 710 and 810, respectively, may be part of a music discovery process. For example, representations 710 and 810 may be music discovery tools displayed on a computing device in media playback systems 106 and/or 108 to facilitate the music discovery process. In particular, the representations 710 and 810 may provide a plurality of search tools without initially requiring an indication regarding a particular media service.

A search tool may be any tool, device, program, and/or interface for discovering media content. For example, a search tool may include a search input for receiving information used to discover media content. In some instances, the search tool may receive information that includes media characteristics to guide the music discovery process. The information received may be related to an emotion, a feeling, a place, and/or a theme of the discovery process, among other possibilities. As such, different types of information or media characteristics may be received throughout the music discovery process. For example, the representations 710 and 810 include a search tool, a browse tool, "The Sentence" tool, a "time of day" tool (illustrating "It's a Thursday afternoon . . . "), and a feeling tool (illustrating "How are you feeling?"), among other possible types of tools. As illustrated by the ellipses, there may be other search tools in the representations 710 and 810 to support the music discovery process.

Further, a user may or may not be registered with any particular media service for using the search tools. As such, the user may utilize the search tools as part of the music discovery process without initially selecting a particular media service. Further, in some instances, the user may be automatically registered to the services and/or prompted to register to the services. For example, the user may be prompted with a question, e.g., "Would you like to sign up to this service with your email, 'user@email.com', and password, 'password123'?"

As noted, one or more of computing devices 102, 110, and 112 may receive an indication of a search tool. For example, consider a scenario such that representation 710 is displayed on a computing device in media playback systems 106 and/or 108. As shown in FIG. 7, the computing device may receive an indication shown as the "It's a Thursday afternoon . . . " search tool, possibly through a touchpad interface on the computing device. Further, the computing device may send the indication to one or more of computing devices 102, 110, and 112. As such, one or more of computing devices 102, 110, and 112 may receive the indication over cloud network 114.

In another example, consider that representation 810 is displayed on a computing device in media playback systems 106 and/or 108. As shown in FIG. 8, the control device may receive an indication of "The Sentence" search tool, possibly through a touchpad interface on the computing device. Further, the computing device may send the indication to one or more of computing devices 102, 110, and 112. As such, one or more of these computing devices 102, 110, and 112 may receive the indication over cloud network 114.

In yet another example, consider that a computing device in media playback systems 106 and/or 108 receives an indication of the "search" and/or "browse" tool in the representations 710 and 810. Further, the computing device may send the indication to one or more computing devices 102, 110, and 112. As such, one or more of these computing devices 102, 110, and 112 may receive the indication over cloud network 114.

FIG. 9 shows a representation of search tools associated with media services. Considering the scenario above, one or more of computing devices 102, 110, and 112 may receive the indication of the search and/or browse tool in representation 710 and 810 to initiate the representation 910. As shown in FIG. 9 and further described below, the representations 910-960 may also be a part of the music discovery process. For example, representation 910 may be displayed on a computing device in media playback systems 106 and/or 108 to facilitate the music discovery process. As shown, representation 910 illustrates a search tool, possibly an alpha-numeric search tool.

In some examples, each search tool of the plurality of search tools may be associated with at least one respective media service. As shown in FIG. 7, a user may select the "It's a Thursday afternoon . . . " search tool in the representation 710 that may be associated with the service 740, possibly a service by music curators for providing media such as Songza™. As shown in the representation 720, the service 740 may facilitate the music discovery process by providing the "It's a Thursday afternoon . . . " search tool. As such, the user may have the option to "subscribe" to the service 740 selecting the "+" indicator but may not be required to subscribe to the service to use the "It's a Thursday afternoon . . . " search tool.

As shown in FIG. 8, a user may select "The Sentence" search tool in the representation 810 that may be associated with the service 840, possibly a media service supporting full-sound headphones such as Beats Music™. As shown in representation 820, the service 840 may facilitate the music discovery process by providing "The Sentence" search tool. As such the user may have the option to "subscribe" to the service 840 selecting the "+" indicator but may not be required to subscribe to the service to use "The Sentence" search tool.

As shown in FIG. 9, the alpha-numeric search tool in the representation 910 may be associated with various services. In particular, by entering "Air" in the search input as the name of an example musical artist, various categories may be provided in the representation 920. Although these categories may be associated with various services, they may be grouped and provided based on functionality of the various services. For example, the Air radio category may be provided based on radio services and/or online radio stations or services. The top tracks category may be provided based services that provide top tracks, possibly including top tracks rated by critics and other listeners. The albums category may be provided based on services that provide album details such as album covers, artist background information, the number of tracks in the album, and track lengths, among other possibilities. The similar artists category and the influential artists category may be provided based services that maintain similar types of music or influential genres of music, for example.

Yet further, the categories may also be associated with services. Air radio category may be associated with radio services 1-3 in the representation 930. The top tracks category may be associated with multiple music library services for purchasing tracks 1-3 in the representation 940. The albums category may be associated with album-downloading services for downloading albums illustrated in the representations 950 and 960. The similar artists category and the influential artists category may also be associated with music library services. Further, a music curation category may be associated with music curation services that collect, sort, and/or stream content that may obtained from various media sources. For example, such music curation services may include services developed by music experts that have pre-programmed stations covering various music genres, artists, and trends in music culture.

In addition, each search tool in FIGS. 7-9 may result in searches being performed by media services that support the respective search tool. For example, the "Search" tool illustrated in the representations 710 and 810 may be supported by various types of media services such as, for example, media services described above in relation to representations 930-960. Yet, the "It's a Thursday afternoon . . . " search tool may be supported by service 740, possibly a service by music curators for providing media such as Songza™. Further, "The Sentence" search tool may be supported by service 840, possibly a media service supporting full-sound headphones such as Beats Music™.

Referring back to FIG. 5, it should be noted that the representations in FIGS. 7-9 may be displayed as part of the controller interface 500. For example, one or more of the representations from FIGS. 7-9 may be displayed in the playback status region 530, the playback queue region 540, and/or the audio content sources region 550, among other possible regions in the controller interface 500. As such, part of the music discovery process may be integrated in the controller interface 500.

b. Receive Indication of Media Characteristic

Returning back to FIG. 6, at block 604, the method 600 involves receiving by the computing device an indication of a media characteristic, where the computing device receives the media characteristic via the indicated search tool. For example, one or more of computing devices 102, 110, and 112 may receive the indication of the media characteristic using an indicated search tool. In particular, a computing device in the media playback systems 106 and/or 108 may receive the indication of the media characteristic and send the indication to one or more of the computing device 102, 110, and 112. As such, the computing devices 102, 110, and 112 may receive the indication of the media characteristic over the cloud network 114.

As shown in FIG. 7, an indication of a media characteristic may be received using the "It's a Thursday afternoon . . . " search tool in the representation 720. For example, the indication of the media characteristic may include a selection of "Brand New Music", "Music to Boost Your Energy", "Music for Working (No Lyrics)", "Calm & Mellow Music", and "Office Music", among other possible selections. As illustrated by the ellipses, there may be other selections in the representation 720 to indicate the media characteristic.

As shown in FIG. 8, an indication of a media characteristic may be received using "The Sentence" search tool in the representation 820. For example, after the words, "I'M", an input, "AT HOME", may be entered to indicate a location associated with the media characteristic. Further, after the words, "& FEEL LIKE", an input, "DANCING", may be entered to indicate a desired action associated with the media characteristic. Yet further, after the words, "WITH", an input, "FRIENDS", may be entered to indicate desired people that may be associated with the media characteristic. In addition, after the words, "TO", a media characteristic, "ELECTRONIC DANCE MUSIC", may be entered to indicate a genre of music associated with the media characteristic. As such, the play button 822 may be selected to "play the sentence" and "The Sentence" search tool may be able to facilitate the music discovery process based on the indicated media characteristics.

As shown in FIG. 9, an indication of a media characteristic may be received using the alpha-numeric search tool in the representation 910. For example, the word, "AIR", may be entered into the search input of the alpha-numeric search tool. In general, media characteristics may include data, metadata, and/or information related to media or media items. Examples of media characteristics may include alpha-numeric characters of an artist name, a band-member's name, a name of a song, a title of an album, and/or a record label's name that produced media, among other possibilities.

In addition, the representation 910 may include a browse tool for browsing various artists that may have a name similar to "Air" such as "Airborne" and "Air Supply", for example. As such, media characteristics may include alpha-numeric characters input in the search tool and/or various indications or selections while browsing in the browse tool in the representation 910. As illustrated by the ellipses, there may be other artists in the representation 910 to browse in the music discovery process.

c. Selecting Media Service that Maintains Media Associated with Indicated Media Characteristic At block 606, the method 600 involves selecting by the computing device one or more of the at least one respective media service that maintains media associated with the indicated media characteristic. For example, one or more of computing devices 102, 110, and 112 may select one or more services of at least one respective service that maintains media associated with the indicated media characteristic. As described below, these computing devices may select one or more services maintaining media, for example, media including certain sounds, genres of music, musical artists, albums, songs, tracks, musical notes, and digital audio files, among other types of media.

In some examples, one or more services that maintain media associated with the indicated characteristic may be selected based on an indication of a search tool. For example, the one or more services may be selected from receiving the indication of a search tool from among a plurality of search tools as described above in block 602 of the method 600. As shown in FIG. 7, by selecting the "It's a Thursday afternoon" search tool in the representation 710, a computing device may select the service 740 for that maintains media. For example, the media may be associated with the indicated media characteristic as described above. In particular, the media may be associated with the media characteristic indicating a selection of "Brand New Music", "Music to Boost Your Energy", "Music for Working (No Lyrics)", "Calm & Mellow Music", and "Office Music", among other possible selections as designated by the ellipses in representation 720.

As shown in FIG. 8, by selecting "The Sentence" search tool in the representation 810, a computing device may select the service 840 that maintains media. For example, the media may be associated with the indicated media characteristics as described above. In particular, the media may be associated with the media characteristics indicating a location, a desired action, desired people, and/or a genre of music, among other possible indications.

As shown in FIG. 9, by entering the media characteristic in representation 910, a computing device may determine categories of services that maintain media. For example, the computing device may determine or identify the air radio category, the top tracks category, the albums category (which may also be an album-downloading category), the similar artists category, and the influential artists category, among other possible categories indicated by the ellipses in the representation 920.

As further shown in FIG. 9, the computing device may select one or more media services that maintain media associated with the indicated media characteristic. For example, the computing device may select radio service 1 (e.g., Pandora® Radio), radio service 2 (e.g., Slacker® Radio), and radio service 3 (e.g., iTunes Radio℠), among other possible radio services indicated by the ellipses in the representation 930. As shown in the representation 930, the option to "subscribe" to radio service 1 may be provided. As such, a user may subscribe to radio service 1 by selecting the "+" indicator but may not be required to subscribe to radio service 1 to listen to radio service 1.

In another example, the computing device may select or identify track 1, track 2, and track 3 of the top tracks category, among other possible tracks indicated by the ellipses in the representation 940. Further, as shown in the representation 940, the option to buy tracks such as track 1 may be provided. In particular, a user may buy track 1 by selecting the "buy" indicator which may provide music library services such as Google Play™, Amazon.com®, and/or a local purchasing service, among other possible services for purchasing track 1. In some instances, one music library service (e.g., Google Play™) may be provided to purchase track 1, another music library service (e.g., Amazon.com®) may be provided to purchase track 2, and yet another music library service (e.g., Rhapsody® Music Service) may be provided to purchase track 3. Further, the user may not be subscribed to or registered with any of these services to view such services for purchasing tracks 1-3. In addition, the name of the service may or may not be displayed, possibly unless a registration is required to obtain the track.

In yet another example, the computing device may select or identify album 1, album 2, album 3, and album 4 of the albums category, among other possible albums indicated by the ellipses in the representation 950. Further, as shown in the representation 950, the option to buy albums such as album 2 may be provided by album-downloading services. In particular, by selecting album 2, the representation 960 may be shown to allow a user may to buy album 2. For example, a user may buy track 1 by selecting the "buy" indicator which may provide music library services such as Google Play™, Spotify®, and/or a local purchasing services, among other possible services.

Further, requests for the media may not be sent to the media services in FIG. 9 until a particular media service is selected in representations 930, 940, 950, and 960. For example, requests to the radio services 1-3 may not be sent until one or more of radio services 1-3 in representation 930 are selected. Further, requests to the music library services described above for representation 940 may not be sent until one or more of tracks 1-3 are selected. Yet further, media requests to the albums-downloading services described above may not be sent until one or more of albums 1-4 are selected. In addition, media requests to the music library services described above for representation 960 may not be sent until one or more of tracks 1-3 are selected. Once the selection the media selection is made, one or more music discovery processes may be terminated.

It should be noted that representation 940 may also provide visual indications of music library services that the user may or may not be registered with and/or subscribing to. In some instances, the user may be required to register with or subscribe to one or more music library services to purchase or listen to tracks 1-3. Yet, in some instances, the user may purchase the tracks 1-3 without initially being a registered user or a subscriber to any of the services. In particular, the user may purchase or stream the tracks 1-3 as a result of cross-linking multiple services, as described above. For example, the cross-linking service database 104 may store user information to register or subscribe the user to various services for receiving media.

d. Sending Indication of Selected Media Services

At block 608, the method 600 involves sending by the computing device an indication of the selected one or more of the at least one respective media service. For example, one or more of computing devices 102, 110, and 112 may send the indication of the selected one or more services capable of providing the media to a computing device in the media playback systems 106 and/or 108 over the cloud network 114. Further, one or more of computing devices 110 and 112 may send the indication to a computing device in media playback systems 106 and/or 108 indirectly via the media server device 102 and cloud network 114, among other possibilities. Yet further, the receiving device in media playback systems 106 and/or 108, e.g., a playback device, may display the media services to facilitate playback of the media.

For example, the computing device may send the indication of the service 740 that maintains media associated with media characteristics, in any manner described above in relation to FIG. 7. In another example, the computing device may send the indication of the service 840 that maintains media associated with the media characteristic, in any manner described above in relation to FIG. 8. In yet another example, the computing device may send the indication of radio services 1-3, music library services for purchasing tracks 1-3, and music library services for purchasing albums 1-4, in any manner described above in relation to FIG. 9.

e. Additional Functions

Additional functions may be carried out in addition to method 600. For example, one or more of computing devices 102, 110, and 112 may receive an indication of a particular media service among the selected one or more of at least one respective media service. In particular, one or more of computing devices 102, 110, and 112 may receive the indication from computing devices in the media playback systems 106 and/or 108. After receiving the indication of the particular service, one or more of computing devices 102, 110, and 112 may send to the particular media service a request for the media associated with the indicated media characteristic. As such, computing devices in the media playback systems 106 and/or 108 may receive the media from the particular media service.

In one example, a playback device may send the request to the particular media service for the media. For example, computing devices 226-228 may send instructions to playback devices 202-224 to play or stream the media associated with the indicated media characteristic. As such, playback devices 202-224 may send the requests for media to the particular media service. Thus, the media may be streamed to a playback device 202-224 for playing music in playback system configuration 200.

Considering the examples above, one or more of computing devices 102, 110, and 112 may be communicatively coupled to at least one playback device in the media playback systems 106 and/or 108. In such instances, computing devices 102, 110, and 112 may cause at least one playback device in the media playback systems 106 and/or 108 to receive the media associated with the indicated media characteristic from the particular media service. As such, computing devices 102, 110, and 112 may cause computing devices in the media playback systems 106 and/or 108 to stream the media associated with the indicated media characteristic in the media playback system 106 and/or 108.

2. Second Example Method of Music Discovery

FIG. 10 shows a flow diagram of another example method. The method 1000 may be implemented by any of the computing devices in media playback systems 106 and 108 in FIG. 10, computing devices 226 and 228 in FIG. 2, computing device 400 in FIG. 4, among other possible computing devices.

The method 1000 may involve displaying by the computing device a plurality of search tools, where each search tool of the plurality of search tools is associated with at least one respective media service. At block 1002, the method 1000 involves receiving by the computing device a selection of a search tool from among a plurality of search tools, where the selected search tool includes a search input. At block 1004, the method 1000 involves receiving by the computing device an indication of a media characteristic, where the computing device receives the media characteristic via the search input. At block 1006, the method 1000 involves selecting by the computing device one or more media services that maintain media associated with the indicated media characteristic. At block 1008, the method 1000 involves causing the computing device to display the one or more media services.

As noted, the method 1000 may involve displaying by the computing device a plurality of search tools, where each search tool of the plurality of search tools is associated with at least one respective media service. For example, any of the computing devices in media playback systems 106 and 108 in FIG. 1, computing devices 226 and 228 in FIG. 2, and/or computing device 400 in FIG. 4 may display the plurality of search tools in graphic representations 710 and 810. For example, computing devices in media playback system 106 may display multiple search tools shown in representation 710. Further, computing devices in media playback system 108 may display multiple search tools shown in representation 810. Yet further, computing devices 226 and 228 may display the one or more search tools in the representation 910.

In some examples, each search tool of the plurality of search tools may be associated with at least one respective media service, as described above in relation to block 602 of FIG. 6.

a. Receiving Selection of a Search Tool From Among Plurality of Search Tools At block 1002, the method 1000 involves receiving by the computing device a selection of a search tool from among a plurality of search tools, where the selected search tool includes a search input. For example, any of the computing devices in media playback systems 106 and 108 in FIG. 1, computing devices 226 and 228 in FIG. 2, and/or computing device 400 in FIG. 4 may receive a selection or an indication of a search tool from among a plurality of search tools. Further, these computing devices may receive the selection or indication in any manner described above in relation to block 602 of FIG. 6.

In some examples, the selected search tool may include a search input. For example, the representation 910 illustrates a selected search tool that includes a search input for entering an artist name. Yet, the search input may also be used for entering a track title, an album title, and genre of music, among other possibilities.

b. Receiving Indication of Media Characteristic

At block 1006, the method 1000 involves receiving by the computing device an indication of a media characteristic, where the computing device receives the media characteristic via the search input. For example, any of the computing devices in media playback systems 106 and 108 in FIG. 1, computing devices 226 and 228 in FIG. 2, and/or computing device 400 in FIG. 4 may receive an indication of a media characteristic. Further, these devices may receive the indication in any manner described above in relation to block 604 of FIG. 6.

In some examples, the computing device may receive the media characteristic using the search input. For example, the representation 910 illustrates receiving the media characteristic of an artist name using the search input.

c. Selecting Media Services that Maintain Media Associated with Media Characteristic At block 1006, the method 1000 involves selecting by the computing device one or more media services that maintain media associated with the indicated media characteristic. For example, any of the computing devices in media playback systems 106 and 108 in FIG. 1, computing devices 226 and 228 in FIG. 2, and/or computing device 400 in FIG. 4 may select one or more services that maintain media associated with the indicated media characteristic. Further, these devices may select the one or more services in any manner described above in relation to block 606 of FIG. 6.

d. Causing Computing Device to Display Media Services

At block 1008, the method 1000 involves causing the computing device to display the one or more media services. For example, any of the computing devices in media playback systems 106 and 108 in FIG. 1, computing devices 226 and 228 in FIG. 2, and/or computing device 400 in FIG. 4 may display the one or more media services that maintain the media associated with the indicated media characteristic.

For example, any of these computing devices may display the service 740 that maintains media associated with the media characteristics shown in representation 720. In another example, these computing devices may display the service 840 that maintains media associated with the media characteristic shown in representation 820. In yet another example, these computing devices may display radio services 1-3, music library services for purchasing tracks 1-3, and music library services for purchasing albums 1-4, as shown in FIG. 9. As such, any of these computing devices may display services in any manner described above in relation to FIGS. 7-9.

e. Additional Functions

Additional functions may be carried out in addition to method 1000. For example, any of the computing devices in media playback systems 106 and 108 in FIG. 1, computing devices 226 and 228 in FIG. 2, and/or computing device 400 in FIG. 4 may receive an indication of a particular media service among the selected one or more media services. In particular, a computing device may receive the indication from a user operating the computing device. After receiving the indication of the particular media service, the computing device may send to the particular service a request for the media associated with the media characteristic.

Considering the examples above, any of the computing devices in media playback systems 106 and 108, computing devices 226 and 228 in FIG. 2, and/or computing device 400 in FIG. 4 may be communicatively coupled to at least one playback device, possibly as part of media playback system, e.g., media playback systems 106-108. In such examples, the computing devices may cause at least one playback device to receive the media associated with the indicated media characteristic from the particular media service. As such, the computing devices may cause the playback device to play the media associated with the indicated media characteristic.

As noted, in some instances, the indicated media characteristic may include one or more alpha-numeric characters of an artist name, an album name, and a song name, among other possibilities. As such, the computing device may select at least one music library service that maintains the media associated with the indicated media characteristic. For example, the music library service may include top tracks of the media. Further, the computing device may be communicatively coupled to at least one playback device. As such, the playback device may display the top tracks from at least one music library service.

3. Third Example Method of a Music Discovery Process

FIG. 11 shows a flow diagram of yet another example method. As noted for the other methods described herein, method 1100 also presents an embodiment of a method that may be implemented within the network configuration 100. In particular, method 1100 may be implemented by any of the computing devices 102, 110, and 112, as discussed above in relation to FIG. 1. It should be understood that method 1100 may be carried out in other suitable network configurations and/or by other suitable network elements as well. Method 1100 may include one or more operations, functions, or actions as illustrated by one or more of blocks 1102-1110.

The method 1100 begins at block 1102 with receiving by a computing device an indication of a media characteristic. At block 1104, the method 1100 involves selecting by the computing device one or more media services that maintain media associated with the indicated media characteristic. At block 1106, the method 1100 involves selecting by the computing device a plurality of categories, where each category of the plurality of categories is associated with at least one respective media service of the one or more media services. At block 1108, the method 1100 involves sending by the computing device an indication of the plurality of categories. At block 1110, the method 1100 involves receiving by the computing device an indication of a particular category among the plurality of categories. At block 1112, the method 1100 involves after receiving the indication of the particular category, sending by the computing device an indication of the at least one respective service of the one or more media services associated with the particular category.

a. Receiving Indication of Media Characteristic

At block 1102, the method 1100 involves receiving by a computing device an indication of a media characteristic. For example, one or more of computing devices 102, 110, and 112 may receive the indication of the media characteristic in any manner described above in relation to block 604 of FIG. 6.

b. Selecting Media Services that Maintain Media Associated with Indicated Media Characteristic At block 1104, the method 1100 involves selecting by the computing device one or more media services that maintain media associated with the indicated media characteristic. For example, one or more of computing devices 102, 110, and 112 may select one or more services that maintain media associated with the indicated media characteristic in any manner described above in relation to block 606 of FIG. 6.

c. Selecting A Plurality of Categories

At block 1106, the method 1100 involves selecting by the computing device a plurality of categories, where each category of the plurality of categories is associated with at least one respective media service of the one or more media services.

In some examples, a computing device may use a search tool to select the plurality of categories. In some instances, an indication of a search tool may be received from among a plurality of search tools to select the plurality of categories. For example, one or more of computing devices 102, 110, and 112 may receive an indication of a search tool in any manner described above in relation to block 602.

In FIG. 9, the alpha-numeric search tool in the representation 910 may be used to select a plurality of categories in representation 920. As noted, although these categories may be associated with various services, they may be grouped and shown based on functionality. For example, the Air radio category may be associated with radio services and/or online radio stations or services. The top tracks category may be based associated with services that maintain top tracks, possibly including top tracks rated by critics and other listeners. For example, the top tracks category may be associated with services that maintain tracks based on metrics for identifying listener preferences, for example, listener preferences in a given geographic region. The albums category may be associated with services that maintain album details such as album covers, artist background information, the number of tracks in the album, and track lengths, among other possibilities. The similar artists category and the influential artists category may be associated with services that maintain similar types of music or influential genres of music, for example.

Each category of the plurality of categories may be associated with at least one respective media service of one or media more services. For example, the Air radio category may be associated with radio services 1-3 in the representation 930. The top tracks category may be associated with music library services for purchasing tracks 1-3 in the representation 940. The albums category may be associated with album-downloading services in the representations 950 and 952. The similar artists category and the influential artists category may also be associated with music library services, among other possible services.

d. Sending Indication of Plurality of Categories

At block 1108, the method 1100 involves sending by the computing device an indication of the plurality of categories. For example, one or more of computing devices 102, 110, and 112 may send the indication of the plurality of categories to a computing device in the media playback systems 106 and/or 108 over the cloud network 114. Further, one or more of computing devices 110 and 112 may send the indication to a computing device in media playback systems 106 and/or 108 indirectly via the media server device 102, among other possibilities.

e. Receiving Indication of Particular Category Among Plurality of Categories At block 1110, the method 1100 involves receiving by the computing device an indication of a particular category among the plurality of categories. For example, one or more of computing devices 102, 110, and 112 may receive an indication of a particular category among the plurality of categories. Further, a computing device in the media playback systems 106 and/or 108 may receive an indication of a particular category and send the indication to one or more of the computing devices 102, 110, and 112. As such, the computing devices 102, 110, and 112 may receive the indication of the particular category over the cloud network 114. Further, one or more of computing devices 110 and 112 may receive the indication indirectly via the media server device 102, among other possibilities.

f. Sending Indication of Service Associated with Particular Category

At block 1112, the method 1100 involves, after receiving the indication of the particular category, sending by the computing device an indication of at least the one respective media service of the one or more media services associated with the particular category indicated at block 1110. For example, one or more of computing devices 102, 110, and 112 may send the indication of at least one service to a computing device in the media playback systems 106 and/or 108 over the cloud network 114. Further, one or more of computing devices 110 and 112 may send the indication to a computing device in media playback systems 106 and/or 108 indirectly via the media server device 102, among other possibilities.

g. Additional Functions

Additional functions may be carried out in addition to method 1100. For example, one or more of computing devices 102, 110, and 112 may receive an indication of a particular media service from at least the one respective media service. In particular, one or more of computing devices 102, 110, and 112 may receive the indication from computing devices in the media playback systems 106 and/or 108. After receiving the indication of the particular media service, one or more of computing devices 102, 110, and 112 may send to the particular service a request for the media associated with the indicated media characteristic. As such, computing devices in the media playback systems 106 and/or 108 may receive the media from the particular service.

Considering the examples above, one or more of computing devices 102, 110, and 112 may be communicatively coupled to computing devices in the media playback systems 106 and/or 108. In such instances, computing devices 102, 110, and 112 may cause at least one playback device in the media playback systems 106 and/or 108 to receive the media associated with the indicated media characteristic from the particular media service. As such, computing devices 102, 110, and 112 may cause computing devices in the media playback systems 106 and/or 108 to stream the media associated with the indicated media characteristic in the media playback system 106 and/or 108.

V. CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As discussed above, examples provided herein relate to a music discovery process. In one aspect, a method is provided. The method involves (a) receiving by a computing device an indication of a search tool from among a plurality of search tools, wherein each search tool of the plurality of search tools is associated with at least one respective media service, (b) receiving by the computing device an indication of a media characteristic, wherein the computing device receives the media characteristic via the indicated search tool, (c) selecting by the computing device one or more of the at least one respective media service that maintains media associated with the indicated media characteristic; and (d) sending by the computing device an indication of the selected one or more of the at least one respective media service.

In another aspect, a non-transitory computer-readable medium is provided. The non-transitory computer-readable medium having instructions stored thereon that are executable by a computing device to cause the first computing device to perform functions, the functions include (a) receiving by the computing device a selection of a search tool from among a plurality of search tools, wherein the selected search tool includes a search input, (b) receiving by the computing device an indication of a media characteristic, wherein the computing device receives the media characteristic via the search input, (c) selecting by the computing device one or more media services that maintains media associated with the indicated media characteristic, and (d) causing the computing device to display the one or more media services.

In another example aspect, a method is provided. The method involves (a) receiving by a computing device an indication of a media characteristic, (b) selecting by the computing device one or more media services that maintain media associated with the indicated media characteristic, (c) selecting by the computing device a plurality of categories, wherein each category of the plurality of categories is associated with at least one respective media service of the one or more media services, (d) sending by the computing device an indication of the plurality of categories, (e) receiving by the computing device an indication of a particular category among the plurality of categories, and (f) after receiving the indication of the particular category, sending by the computing device an indication of the at least one respective media service of the one or more media services associated with the particular category.

In yet another example aspect, another method is provided. The method involves (a) receiving by the computing device a selection of a search tool from among a plurality of search tools, wherein the selected search tool includes a search input, (b) receiving by the computing device an indication of a media characteristic, wherein the computing device receives the media characteristic via the search input, (c) selecting by the computing device one or more media services that maintains media associated with the indicated media characteristic, and (d) causing the computing device to display the one or more media services.

In one other example aspect, an additional method is provided. The method involves (a) displaying by a computing device a search input, (b) receiving by the computing device an indication of a media characteristic, wherein the computing device receives the media characteristic via the search input, (c) selecting by the computing device one or more of the at least one respective media service that maintains media associated with the indicated media characteristic, (d) selecting by the computing device a plurality of categories, wherein each category of the plurality of categories is associated with at least one respective media service of the one or more media services, (e) displaying by the computing device the plurality of categories, (f) receiving by the computing device an indication of a particular category among the plurality of categories, and (g) after receiving the indication of the particular category, displaying by the computing device the at least one respective media service associated with the particular category.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative examples mutually exclusive of other examples. As such, the examples described herein, explicitly and implicitly understood by one skilled in the art, can be combined with other examples.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain examples of the present disclosure can be practiced without certain, specific details. In other instances, well known methods, procedures, components, and circuitry have not been described in detail to avoid unnecessarily obscuring aspects of the examples. Accordingly, the scope of the present disclosure is defined by the appended claims rather than the forgoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A control device of a media playback system, the control device comprising:
    a display;
    at least one communications interface;
    at least one processor; and
    at least one non-transitory computer-readable medium comprising program instructions that are executable by the at least one processor such that the control device is configured to:
    display, via the display, a graphical user interface;
    receive, via the graphical user interface, an input corresponding to a selection of a media content characteristic;
    based on the input:
        retrieve, via the at least one communications interface over at least one network, first data corresponding to a first media discovery tool of a first media streaming service registered with the media playback system, the first media discovery tool associated with a first plurality of media items provided by the first media streaming service;
        retrieve, via the at least one communications interface over the at least one network, second data corresponding to a second media discovery tool of a second media streaming service registered with the media playback system, the second media discovery tool associated with a second plurality of media items provided by the second media streaming service, wherein the second plurality of media items is associated with the selected media content characteristic;

based on the first data and the second data, update the graphical user interface to display:
(i) a first selectable graphical representation corresponding to the first media discovery tool that, when selected, causes the control device to update the graphical user interface to display a first selectable control, wherein selecting the first selectable control causes at least one first media item from the first plurality of media items provided by the first media streaming service to be queued in a playback queue; and
(ii) a second selectable graphical representation corresponding to the second media discovery tool that, when selected, causes the control device to update the graphical user interface to display a second selectable control, wherein selecting the second selectable control causes at least one second media item from the second plurality of media items provided by the second media streaming service to be queued in the playback queue; and cause at least one playback device of the media playback system to play back the playback queue.

2. The control device of claim 1, wherein the program instructions that are executable by the at least one processor such that the control device is configured to cause the at least one playback device to play back the playback queue comprise program instructions that are executable by the at least one processor such that the control device is configured to:
stream, via a first communication interface of the at least one communications interface, the at least one first media item from one or more first servers of the first media streaming service;
stream, via the first communication interface of the at least one communications interface, the at least one second media item from one or more second servers of the second media streaming service; and
transmit, via a second communication interface of the at least one communications interface, the streaming at least one first and at least one second media items to the at least one playback device.

3. The control device of claim 1, wherein the program instructions that are executable by the at least one processor such that the control device is configured to cause the at least one playback device to play back the playback queue comprise program instructions that are executable by the at least one processor such that the control device is configured to:
cause the at least one playback device to stream the at least one first media item from one or more first servers of the first media streaming service and to stream the at least one second media item from one or more second servers of the second media streaming service.

4. The control device of claim 1, wherein:
the at least one playback device comprises headphones; and
the at least one communications interface comprises a Bluetooth communications interface.

5. The control device of claim 1, wherein:
the first plurality of media items is associated with a first media characteristic different from the media content characteristic selected via the graphical user interface; and the second plurality of media items is associated with a second media characteristic different from the media content characteristic selected via the graphical user interface.

6. The control device of claim 5, wherein the first media characteristic and the second media characteristic are the same media characteristic.

7. The control device of claim 5, wherein one or more of the media content characteristic, the first media characteristic, or the second media characteristic comprise one or more of: a type of media, an artist name, a media item name, or an album name.

8. The control device of claim 1, wherein the at least one non-transitory computer-readable medium further comprises program instructions such that the control device is configured to:
receive, via the at least one communications interface over the at least one network, data corresponding to a third media discovery tool of the first media streaming service, the third media discovery tool associated with a third plurality of media items provided by the first media streaming service; and
display, on the graphical user interface, a corresponding third selectable graphical representation corresponding to the third media discovery tool that, when selected, causes the control device to display a third updated graphical user interface comprising a third selectable control, wherein selecting the third selectable control causes at least one third media item from the third plurality of media items provided by the first media streaming service to be queued in the playback queue of the at least one playback device.

9. The control device of claim 1, wherein the program instructions that are executable by the at least one processor such that the control device is configured to cause the at least one playback device to play back the playback queue comprise program instructions that are executable by the at least one processor such that the control device is configured to:
cause at least two playback devices to play back the playback queue in synchrony.

10. A non-transitory computer-readable medium having stored thereon instructions executable by one or more processors to cause a control device of a media playback system to perform functions comprising:
displaying, via the display, a graphical user interface;
receiving, via the graphical user interface, an input corresponding to a selection of a media content characteristic;
based on the input:
retrieving, via at least one communications interface over at least one network, first data corresponding to a first media discovery tool of a first media streaming service registered with the media playback system, the first media discovery tool associated with a first plurality of media items provided by the first media streaming service;
retrieving, via the at least one communications interface over the at least one network, second data corresponding to a second media discovery tool of a second media streaming service registered with the media playback system, the second media discovery tool associated with a second plurality of media items provided by the second media streaming service, wherein the second plurality of media items is associated with the selected media content characteristic;

based on the first data and the second data, updating the graphical user interface to display:
(i) a first selectable graphical representation corresponding to the first media discovery tool that, when selected, causes the control device to update the graphical user interface to display a first selectable control, wherein selecting the first selectable control causes at least one first media item from the first plurality of media items provided by the first media streaming service to be queued in a playback queue; and
(ii) a second selectable graphical representation corresponding to the second media discovery tool that, when selected, causes the control device to update the graphical user interface to display a second selectable control, wherein selecting the second selectable control causes at least one second media item from the second plurality of media items provided by the second media streaming service to be queued in the playback queue; and
causing at least one playback device of the media playback system to play back the playback queue.

11. The non-transitory computer-readable medium of claim 10, wherein causing the at least one playback device to play back the playback queue comprises:
streaming, via a first communication interface of the at least one communications interface, the at least one first media item from one or more first servers of the first media streaming service;
streaming, via the first communication interface of the at least one communications interface, the at least one second media item from one or more second servers of the second media streaming service; and
transmitting, via a second communication interface of the at least one communications interface, the streaming at least one first and at least one second media items to the at least one playback device.

12. The non-transitory computer-readable medium of claim 10, wherein causing the at least one playback device to play back the playback queue comprises causing the at least one playback device to stream the at least one first media item from one or more first servers of the first media streaming service and to stream the at least one second media item from one or more second servers of the second media streaming service.

13. The non-transitory computer-readable medium of claim 10, wherein:
the at least one playback device comprises headphones; and
the at least one communications interface comprises a Bluetooth communications interface.

14. The non-transitory computer-readable medium of claim 10, wherein:
the first plurality of media items is associated with a first media characteristic different from the media content characteristic selected via the graphical user interface; and
the second plurality of media items is associated with a second media characteristic different from the media content characteristic selected via the graphical user interface.

15. The non-transitory computer-readable medium of claim 14, wherein the first media characteristic and the second media characteristic are the same media characteristic.

16. The non-transitory computer-readable medium of claim 14, wherein one or more of the media content characteristic, the first media characteristic, or the second media characteristic comprise one or more of: a type of media, an artist name, a media item name, or an album name.

17. The non-transitory computer-readable medium of claim 10, further having stored thereon instructions to cause the control device to perform functions comprising:
receiving, via the at least one communications interface over the at least one network, data corresponding to a third media discovery tool of the first media streaming service, the third media discovery tool associated with a third plurality of media items provided by the first media streaming service; and
displaying, on the graphical user interface, a corresponding third selectable graphical representation corresponding to the third media discovery tool that, when selected, causes the control device to display a third updated graphical user interface comprising a third selectable control, wherein selecting the third selectable control causes at least one third media item from the third plurality of media items provided by the first media streaming service to be queued in the playback queue of the at least one playback device.

18. The non-transitory computer-readable medium of claim 10, wherein causing the at least one playback device to play back the playback queue comprises causing at least two playback devices to play back the playback queue in synchrony.

19. A method to be performed by a control device of a media playback system, the method comprising:
displaying, via the display, a graphical user interface;
receiving, via the graphical user interface, an input corresponding to a selection of a media content characteristic;
based on the input:
retrieving, via at least one communications interface over at least one network, first data corresponding to a first media discovery tool of a first media streaming service registered with the media playback system, the first media discovery tool associated with a first plurality of media items provided by the first media streaming service;
retrieving, via the at least one communications interface over the at least one network, second data corresponding to a second media discovery tool of a second media streaming service registered with the media playback system, the second media discovery tool associated with a second plurality of media items provided by the second media streaming service, wherein the second plurality of media items is associated with the selected media content characteristic;
based on the first data and the second data, updating the graphical user interface to display:
(i) a first selectable graphical representation corresponding to the first media discovery tool that, when selected, causes the control device to update the graphical user interface to display a first selectable control, wherein selecting the first selectable control causes at least one first media item from the first plurality of media items provided by the first media streaming service to be queued in a playback queue; and
(ii) a second selectable graphical representation corresponding to the second media discovery tool that, when selected, causes the control device to update the graphical user interface to display a second selectable control, wherein selecting the second selectable control causes at least one second media item from the second plurality of media items provided by the second media streaming service to be queued in the playback queue; and causing at least one playback device of the media playback system to play back the playback queue.

20. The method of claim 19, wherein causing the at least one playback device to play back the playback queue comprises causing the at least one playback device to stream the at least one first media item from one or more first servers of the first media streaming service and to stream the at least one second media item from one or more second servers of the second media streaming service.

* * * * *